(12) United States Patent
Jauriqui et al.

(10) Patent No.: US 10,746,704 B2
(45) Date of Patent: Aug. 18, 2020

(54) USE OF RESONANCE INSPECTION FOR PROCESS CONTROL

(71) Applicant: Vibrant Corporation, Albuquerque, NM (US)

(72) Inventors: Leanne Jauriqui, Albuquerque, NM (US); Lemna J. Hunter, Corrales, NM (US); Greg Weaver, Rio Rancho, NM (US)

(73) Assignee: Vibrant Corporation, Albuquerque, NM (US)

( * ) Notice: Subject to any disclaimer, the term of this patent is extended or adjusted under 35 U.S.C. 154(b) by 37 days.

(21) Appl. No.: 16/175,111

(22) Filed: Oct. 30, 2018

(65) Prior Publication Data

US 2019/0212302 A1 Jul. 11, 2019

Related U.S. Application Data

(60) Provisional application No. 62/614,036, filed on Jan. 5, 2018.

(51) Int. Cl.
| | | |
|---|---|---|
| *G01N 29/12* | (2006.01) | |
| *G01N 29/44* | (2006.01) | |
| *G05B 19/4063* | (2006.01) | |
| *G01N 29/42* | (2006.01) | |
| *G01N 29/46* | (2006.01) | |

(52) U.S. Cl.
CPC ............. *G01N 29/12* (2013.01); *G01N 29/42* (2013.01); *G01N 29/4418* (2013.01); *G01N 29/4427* (2013.01); *G01N 29/4454* (2013.01); *G01N 29/4472* (2013.01); *G01N 29/46* (2013.01);

(Continued)

(58) Field of Classification Search
CPC .. G01N 22/00; G01N 29/348; G01N 29/4472; G01N 29/46; G01N 29/4427; G01N 29/045; G01N 29/12; G01N 2291/103; G01N 29/4445; G01N 29/4409; G01N 2291/014; G01N 29/42;
(Continued)

(56) References Cited

U.S. PATENT DOCUMENTS

| | | | | |
|---|---|---|---|---|
| 5,666,158 A | * | 9/1997 | Sekine | G01S 3/7864 348/209.99 |
| 5,895,857 A | * | 4/1999 | Robinson | G01H 1/003 73/602 |

(Continued)

*Primary Examiner* — Kidest Bahta
(74) *Attorney, Agent, or Firm* — Holzer Patel Drennan

(57) ABSTRACT

Generation of feedback for a part production process based on vibrational testing of parts produced by the part production process. A response characteristic may be identified from vibrational data regarding the parts that is correlated to a process variable of the part production process. The response characteristic may relate to a state of the process variable such that identification of the response characteristic may allow for generation of feedback regarding adjustment of a process control. Such response characteristic may relate to a vibrational metric regarding vibrational data and may comprise identifying a trend in data between a plurality of parts. Also presented are approaches to evaluation of parts, including batch evaluation of parts in which collective vibrational data regarding a plurality of parts belonging to a batch are analyzed. The process control aspects may be performed independently or in combination with part evaluation.

20 Claims, 11 Drawing Sheets

(52) U.S. Cl.
CPC ... *G05B 19/4063* (2013.01); *G01N 2291/014* (2013.01); *G05B 2219/37634* (2013.01)

(58) Field of Classification Search
CPC ........... G01N 29/4418; G01N 29/4454; G05B 19/4063; G05B 2219/37634
See application file for complete search history.

(56) References Cited

U.S. PATENT DOCUMENTS

| | | | | |
|---|---|---|---|---|
| 6,035,696 | A * | 3/2000 | Kiefer | G01H 13/00 702/97 |
| 2009/0044627 | A1 * | 2/2009 | Brady | G01N 29/2406 73/643 |
| 2010/0280630 | A1 | 11/2010 | Worek | |
| 2011/0205509 | A1 | 8/2011 | Brunner | |
| 2012/0109580 | A1 * | 5/2012 | Holroyd | G06F 15/00 702/182 |
| 2012/0158319 | A1 | 6/2012 | Hunter | |
| 2012/0239318 | A1 * | 9/2012 | Tokita | A61B 5/0091 702/56 |
| 2013/0074600 | A1 * | 3/2013 | Hunter | G01N 29/44 73/579 |
| 2014/0232532 | A1 | 8/2014 | Makai | |

\* cited by examiner

USE OF RESONANCE INSPECTION FOR PROCESS CONTROL

CROSS-REFERENCE TO RELATED APPLICATIONS

This patent application claims the benefit of U.S. 62/614,036 entitled "USE OF RESONANCE INSPECTION FOR PROCESS CONTROL," and filed on Jan. 5, 2017, the entirety of which is hereby incorporated by reference.

FIELD

The present disclosure relates to use of vibrational data for of parts, and in particular, to use of vibrational data for parts to assist in process control of a part production process used to produce parts.

BACKGROUND

Resonance inspection is a proven non-destructive method for the evaluation of stiff components. Resonance inspection may be provided by impulse-induced vibration, swept-sine wave stimulation, and other acoustic or ultrasonic techniques in which a part under test is vibrated and the vibrational response of the part is measured. Resonance measurements may be made with electronic listening devices, contact transducers, laser interferometers, and other contact and non-contact means. Resonance data may be processed via fast Fourier Transforms (FFT), direct waveform measure, or other methods. Resonance inspection can provide quantifiable results from non-destructive test means that may be used to evaluate parts.

Part resonances are determined by the part's material properties, stiffness, and dimensions, all of which are typically tightly tied to a part's ability to perform as designed. When these material or geometric features are changed in a manner that will affect part performance, due to manufacturing defects or in-service damage, the resonances will reflect these changes, and the part can be discriminated from the acceptable population based on the resonance response of a part under test.

SUMMARY

It is presently recognized that vibrational inspection of parts, including resonance inspection techniques, may provide meaningful information that may be used to monitor, evaluate, and/or modify a part production process used to produce the parts. That is, while it has been proposed that vibrational data be used to evaluate individual parts or a population of parts to determine if such parts are acceptable for performance as designed, the present disclosure further contemplates that vibrational data regarding parts may be used for monitoring and evaluation of a part production process used to produce the parts. In this regard, it has been found that the behavior of the vibrational response of a part that is vibrated (referred to herein as a vibrational response characteristic or resonance response characteristic) may be correlated to certain variables to provide information regarding such variables. Specifically, such variables may be related to characteristics of the part itself or characteristics of a process used to produce the part. In either regard, the information gained regarding these variables may be used to provide feedback to a part production process used to produce parts. As such, information regarding the production process may be obtained by the vibrational inspection of parts that may be used to improve the part production process to, for example, make more consistent parts and/or reduce the number of unacceptable parts produced by the process. For instance, after testing one or more parts, a response characteristic may be identified from vibrational data acquired during the testing. The response characteristic may be correlated to a process variable. The vibrational data, and specifically the response characteristic identified from the vibrational data, may provide feedback regarding a control for the process that may be used to adjust a control of the part production process that controls the process variable. In turn, process feedback may be provided based on the vibrational data that may be used to modify or otherwise control the part production process.

In various embodiments provided herein, parts may be evaluated individually or as a batch of parts. A batch of parts generally includes a plurality of parts. It may be appreciated that different evaluations may be made in relation to individual ones of the parts and batches of parts. For instance, a response characteristic may be identified from an individual part regarding a certain process variable. However, other response characteristics related to other process variables may not be identifiable in a single part. In turn, a batch of parts may be collectively analyzed to identify a response characteristic that may provide information regarding a part production process.

Moreover, certain information regarding a plurality of parts may be obtained from a batch analysis in which vibrational data regarding a plurality of parts are collectively analyzed. In this regard, the present disclosure describes evaluation of parts using a batch analysis in which vibrational data regarding a plurality of parts is analyzed. This batch analysis may be used in connection with a batch sort to evaluate the batch of parts (e.g., for classification of the parts) as compliant or non-compliant parts. That is, even if individual ones of the parts within a batch of parts is classified as a compliant, the individual ones of the parts may be classified as non-compliant based on the batch analysis. This batch evaluation may allow for monitoring of a characteristic of a part production process that may only be identifiable from a plurality of parts may affect the compliance of such parts. In turn, a batch analysis may be applied to a plurality of parts to determine compliance of such parts. Such batch analysis may be conducted in conjunction with a sort of individual parts or may be conducted as in independent test apart from any individualized testing of parts.

It may also be appreciated that the response characteristic identified from vibrational testing of one or more parts may be independent from classification of any one or more of the parts as compliant or non-compliant in relation to a sort. That is, a response characteristic that reflects a state of a process variable may be identified from compliant parts. Accordingly, such a response characteristic may even indicate that a correlated process variable requires action to modify a control of a process variable where the part is compliant. This may be valuable in that vibrational testing to identify a response characteristic from one or more parts may provide feedback to a part production process before the parts produced by the part production process (or a statistically significant number of parts produced) become non-compliant. For instance, the vibrational testing may allow for identification of a trend among a response characteristic that is correlated to a process variable. Identification of such a trend in a response characteristic may allow for adjustment of a process control to address the trend in the response characteristic (e.g., to reverse a trend indicating the process is trending out of control) before the vibrational data regarding the parts being produced by the part production process are classified as non-compliant parts. In turn, the vibrational analysis described herein may allow for process control of a part production process prior to the part production process trending out of control to produce non-compliant parts.

As may be appreciated from the foregoing, having the ability to identify a process variable that correlates to a response characteristic may facilitate the process control feedback described herein. As such, the present disclosure includes approaches that allow for correlation of vibrational data regarding parts produced by a part production process to process variables regarding the part production process. As will be described in greater detail below, this correlation process may include identifying or calculating one or more metrics from the vibrational data. Specifically, in some contexts of the present disclosure, the vibrational testing may comprise resonance inspection and the resulting vibrational data may be resonance response data. As such, one or more resonance metrics may be identified or calculated regarding the resonance response data. In particular, the metric may include, but is not limited to, a multi-frequency analysis. This multi-frequency analysis may include combining multiple frequency measures and/or generating further metrics therefrom. In any regard, the metrics from the vibrational data may be analyzed in relation to changes in one or more process variables used to produce parts to identify a correlation between a response characteristic in the vibrational data (that may include or relate to a metric from the data) and a process variable. Identification of such correlation between a response characteristic and a process variable may allow for control over the process variable in response to the response characteristic as recognized from vibrational data regarding a part produced by a part production process.

Accordingly, a first aspect of the present disclosure may be characterized as a method for control of a part production process. The method includes acquiring vibrational data for at least a first part produced by the part production process. As will be appreciated in the description below, such acquiring may include performing testing of the first part or simply accessing the data from a previously populated data store. The vibrational data includes a frequency response of the first part when excited at a plurality of input frequencies. The method further includes identifying a response characteristic from the vibrational data. The response characteristic identified from the vibrational data is correlated to a process variable of the part production process. The method further includes determining a state of the process variable of the part production process based on the response characteristic correlated to the process variable and adjusting a control of the part production process related to the process variable in response to the state of the process variable.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the method of the first aspect may be used in conjunction with a resonance testing system that may be operative to measure a resonance response of a part (e.g., to acquire the vibrational data). The vibrational data may be resonance response data of the first part. This resonance response data may be gathered in response to the exciting the part at the plurality of frequencies. In this regard, the response characteristic may correspond to a resonance metric based on the resonance response data. As will be discussed in greater detail below, whether from resonance data or other vibrational data, such a metric may include any characteristic of the vibrational data including magnitudes, frequencies, relationships between resonance modes, or any other appropriate characterization of the vibrational data.

In an embodiment, the method of the first aspect may include acquiring vibrational data for a plurality of parts produced by the part production process. In this regard, the response characteristic may be at least based on a change in the vibrational data between different ones of the plurality of parts (e.g., relative to the order in which the parts are produced). That is, rather than identifying a resonance response in any given one part, the method may include monitoring a plurality of parts to detect a change in vibrational data between the parts that is indicative of a response characteristic that is correlated to a process variable. The change in the vibrational data between different ones of the plurality of parts may include a trend in the response characteristic measured over a given number of the plurality of parts relative to the order in which the parts were produced or a given period of time over which the parts are produced. That is, the state of the process variable may be determined based on identification of a trend in the response characteristic. A trend may be characterized as a progression of a value in a single direction over the given number of parts or the given period of time. The value that is subject to the trend may correspond directly to the value of the data or some characteristic or metric of the data such as, for example, a value related to the variability of the data. In this regard, a progression of the variability of the data (e.g., a contraction or expansion of the variability of the data) over a given number of parts may comprise a trend. Such a progression of the value may be constant over the given number of parts or given period of time such that each subsequent value represents a continual progression in the single direction over the given number of parts or given period of time, or the progression may be characterized as some statistical representation of the values of parts over the given number of parts or given period of time. In this latter regard, not every subsequent part within the given number of parts or within the given period of time need progress in the single direction, but the statistical representation (e.g., a moving average or the like) over a given number of parts or a given period of time may move in the single direction.

In any regard, the given number of parts over which a trend may be identified may vary in various embodiments of the method of the first aspect. For instance, in the case where a trend is identified over the given number of parts, the given number of the plurality of parts may be based on a production rate of the part production process. In an embodiment, the given number of the plurality of parts may be at least about 5, at least about 10, at least about 25, at least about 50, at least about 100, at least about 250, at least about 500, or at least about 1,000. In addition, the given number of parts may be not more than about 5,000, not more than about 2,500, not more than 2,000, not more than about 1,000, not more than about 100, not more than about 75, not more than 50, or not more than about 25, provided that the upper bound on the given number of parts is greater than the lower bound on the given number of parts.

Alternatively, a trend may be identified over a given period of time in which parts are produced. In this regard, the change in the vibrational data between different respective ones of the plurality of parts may include a trend in the response characteristic measured over a given time period in which the plurality of parts are produced. The given time period may be based on a production rate of the part production process. In various embodiments, the given period of time may be at least about 1 minute (0.017 hours), at least about 5 minutes (0.083 hours), at least about 10 minutes (0.167 hours), at least about 15 minutes (0.25 hours), at least about 30 minutes (0.5 hours), at least about 1 hour, or at least about 2 hours. In addition, the given period of time may be not more than about 8 hours, not more than about 5 hours, not more than 3 hours, or not more than about 1 hour, not more than about 45 minutes (0.75 hours), not more than about 30 minutes (0.5 hours), not more than about 15 minutes (0.25 hours), or not more than about 10 minutes (0.167 hours), provided that the upper bound on the given period of time is greater than the lower bound on the period of time.

The method of the first aspect may also include evaluating the first part to determine if the part is compliant or acceptable for its intended use, in addition to analysis of the vibrational data to determine the state of a process variable. For instance, the method may also include testing the frequency response of the first part against a sort. The sort may be based upon vibrational data from a qualification population of parts. In this regard, the sort may include at least one boundary relative to the frequency response defining at least one of a compliant part classification sort result or a non-compliant part classification sort result. That is, the sort may be operative to classify the first part into one of a compliant part classification or a non-compliant part classification based on the vibrational data of a part in relation to the at least one boundary.

As may be appreciated, detecting that a process variable should be adjusted may be especially beneficial if the detection of the response characteristic indicative that the process variable should be adjusted may be detected prior to the part production process actually producing a statistically significant number of defective parts or parts that would be classified as non-compliant. In this regard, the method of the first aspect may include adjusting the control prior to a change in the vibrational data between ones of the plurality of parts resulting in a non-compliant part classification sort result for a part of the plurality of parts produced by the part production process. That is, as parts are analyzed to identify a response characteristic in the vibrational data for the parts, the response characteristic may be identified that indicates a process variable is to be adjusted prior to the vibrational data indicating that any given part or a statistically significant number of parts is non-compliant. In short, the response characteristic may be identified that indicates a process variable adjustment from compliant parts so that the process variable may be adjusted prior to the part production process trending out of control or producing non-compliant parts. As an example, the state of the process variable may be determined based on the response characteristic has exceeded a limit established in relation to the response characteristic. The limit may be established relative to a boundary within the vibrational data between compliant parts and non-compliant parts such that the limit may be met prior to the boundary being met by parts.

As described above, the state of the process variable may be determined based on the response characteristic that is correlated to the process variable. As an example, the response characteristic may indicate that the process variable is in a state that is preferably adjusted to return the state of the process variable into or toward a controlled condition. Not only can the state of the process variable that is determined based on the response characteristic indicate that the process variable is to be adjusted, but the state of the process variable may also provide information that may be used in the adjusting of the control of the process variable. For instance, the state of the process control may be indicative of a magnitude of adjustment of the control and/or a direction of adjustment of the control. That is, because the response characteristic may be correlated to the process variable, the response characteristic may provide that that allows the state of the process variable to be determined such that either or both of a direction of adjustment of the control and/or the magnitude of adjustment may be provided. In this regard, the correlation between the response characteristic and the process variable may include a quantification of the relationship between the response characteristic and the process variable such that identification of the response characteristic may allow for determination of a quantity by which the process variable is to be adjusted (including the direction and/or magnitude of control).

In an embodiment of the method of the first aspect, the method may also include correlating the response characteristic from the vibrational data to the process variable. That is, the method may include determining the correlation between the response characteristic and the process variable. The correlating may include acquiring vibrational data for a plurality of parts produced by the part production process and obtaining respective different process variable values for the process variable for each of the plurality of parts. Specifically, the respective process variable values may differ with regard to the plurality of parts. This range of values for the process variable used to produce the plurality of parts may result in the plurality of parts having varying vibrational data resulting from the variation in the process variable to facilitate the correlation between the response characteristic of the vibrational data and the process variable. In turn, the method may include identifying a correlation between the process variable and the vibrational data.

Various approaches to determining the correlation may be provided. For instance, the identifying the correlation may include evaluation relative to a multidimensional data set in which each of a plurality of vibration data metrics comprise corresponding respective metric dimensions in the multidimensional data set and the process variable comprises a non-vibrational dimension in the multidimensional data set. In an embodiment, the correlation includes evaluating a plurality of metric dimensions relative to the non-vibrational dimension to determine the correlation between a given metric dimension and the non-vibrational dimension. The evaluating may include at least one of a classification analysis or a regression analysis that may identify and/or quantify a correlation between one or more of the vibrational dimensions relative to the non-vibrational dimensions. As way of example, the evaluating may include at least one of a non-linear least squares regression, a correlation coefficient analysis, an analysis of variance (ANOVA), k-means clustering, principal components analysis, or random forest analysis.

As addressed above, the method of the first aspect may include testing the first part to obtain the vibrational data used in the method. In this regard, the method may include exciting the first part at the plurality of input frequencies and measuring the frequency response of the first part. In addition, the method may include generating the vibrational data for the first part based on the measured frequency response of the first part. In this regard, the vibrational data may include raw vibrational response data and/or one or more metrics generated based on the raw vibrational response data. A metric may define any value, relative relation, statistical representation, mathematical transformation, or combinations thereof that are generated from the raw vibrational data. Examples of metrics may include amplitudes of frequency responses, relative positions of resonance peaks within the frequency response, mathematical transformations such as Fast Fourier transforms (FFTs), or any other appropriate metric generated from the response data.

The response characteristic identified from the vibrational data may allow for a wide range of one or more process variables to be effectively monitored through inspection of the vibrational data. For instance, in an embodiment, the process variable may include a manufacturing variable. The manufacturing variable may relate to one or more manufacturing process steps or equipment used in the part production process. Examples of manufacturing variables include, but are not limited to, a process temperature, a process rate, manufacturing component wear, or a raw material property. In an embodiment, the process variable may relate to a component variable. That is, the process variable may relate to a resulting quality of the part that is produced by the manufacturing process. In at least some instances, the component variable may result from the process variable. That is, the response characteristic may be correlated to a component variable that results from another process variable (e.g., a manufacturing variable). As an example, a root cause of a change in the vibrational data may be the wear of a mold used in the part production process. The wear of the mold may cause resulting parts produced by the wearing mold to change in dimension. The change in dimension may result in a change in the vibrational data in the parts having a growing dimension, which in turn is a function of the wear of the mold. As such, the response characteristic may be the change in the vibrational data that indicates the change in the part dimension, which in turn is correlated to the wear of the mold. In any regard, the component variable may include, but is not limited to, a part dimension, a stress state, a crystallographic orientation, a material property, phase ratios, part chemistry, or part microstructure.

As will also be discussed in greater detail below, a plurality of parts may belong to a batch of parts that may be used for various aspects described herein. For instance, the acquiring may include acquiring collective vibrational data regarding a plurality of parts produced by the production part process and the response characteristic may include a metric from the collective vibrational data. As discussed in greater detail below, such a response characteristic determined from the collective vibrational data may include a characteristic of the collective vibrational data or may include a change in the collective vibrational data over a plurality of batches.

A second aspect of the present invention may be characterized as a tool for controlling a part production system that performs a part production process. The tool may comprise a data store comprising vibrational data for at least a first part produced by the part production process. The vibrational data includes a frequency response of the first part when excited at a plurality of input frequencies. The tool also includes a correlation analysis module in operative communication with the data store to retrieve the vibrational data. The correlation analysis module is operative to identify a response characteristic from the vibrational data that is correlated to a process variable of the part production process and determine a state of the process variable of the part production process based on the response characteristic correlated to the process variable. In turn, the tool includes a control module that is in operative communication with a control of the part production process that controls the process variable. The control module is operative to determine an adjustment of the control of the part production process related to the process variable in response to the state of the process variable.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, the tool of the second aspect may be used to perform any or all of the features of the method of the first aspect. In this regard, any feature described above in relation to the method of the first aspect may be applicable to and/or performed by the tool of the second aspect.

In addition, the tool of the second aspect may include one or more modules operative to perform a specified function. Any of the modules described in the tool of the second aspect or in any other portion of this disclosure may comprise any appropriate hardware or software components to perform in the manner described in relation to such a module. In this regard, a module may include one or more hardware components including, for example, a field programmable gate array, an application specific integrated circuit, or other hardware component. Additionally or alternatively, a module may be implemented using software. As such, reference to a module may include corresponding computer hardware for execution of the module including one or more processors that may be in operative communication with a physical memory device. Specifically, the one or more processors may retrieve instructions comprising non-transitory machine-readable instructions that may be stored digitally on the physical memory device. In turn, the instructions, when executed by the processor, may configure the processor to perform the functionality described in relation to the module. Additional computer hardware may be provided to facilitate operation of the processor including busses, networking components, or the like, and may be included as part of a module.

In an embodiment, the vibrational data comprises resonance response data and the response characteristic corresponds to a resonance metric based on the resonance response data. The vibrational data may be for a plurality of parts produced by the part production process, and the response characteristic may be at least based on a change in the vibrational data between different ones of the plurality of parts.

In an embodiment, the change in the vibrational data between different ones of the plurality of parts may include a trend in the response characteristic measured over a given number of the plurality of parts relative to the order in which the parts were produced. The given number of the plurality of parts may be at least 10 parts. In other embodiments, the given number of parts may be recording to any of the values described above in relation to the first aspect. Also, the given number of the plurality of parts may be based on a production rate of the part production process.

In another embodiment, the change in the vibrational data between different respective ones of the plurality of parts comprises a trend in the response characteristic measured over a given time period in which the plurality of parts are produced. The given time period may be at least 0.5 hours. In other embodiments, the given time period may be recording to any of the values described above in relation to the first aspect. Also, the given time period may be based on a production rate of the part production process.

The tool of the second aspect may also include a vibrational testing system for testing the frequency response against a sort. The sort may be based upon vibrational data from a qualification population. In this regard, the sort may include at least one limit relative to the frequency response defining at least one of a compliant part classification sort result or a non-compliant part classification sort result. As described above in relation to the first aspect, it may be desirable to control the part production process prior to producing parts that are categorized as non-compliant. Accordingly, the control module may adjust the control prior to a change in the vibrational data between ones of the plurality of parts resulting in a non-compliant part classification sort result for a part of the plurality of parts produced by the part production process.

In an embodiment, the state of the process variable may be determined by the correlation analysis module based on the response characteristic has exceeded a limit established in relation to the response characteristic. The state of the process variable may be determined by the correlation analysis module based on identification of a trend in the response characteristic. The state of the process control may be indicative of a magnitude of adjustment of the control. Additionally, the state of the process control may be indicative of a direction of adjustment of the control.

In an embodiment, the correlation analysis module may be operative to correlate the response characteristic from the vibrational data to the process variable. The correlation analysis module may be operative to acquire vibrational data for a plurality of parts produced by the part production process, obtain respective process variable values for the process variable for each of the plurality of parts, and identify a correlation between the process variable and the vibrational data. The respective process variable values differ with regard to the plurality of parts. The correlation analysis module may be operative to evaluate a multidimensional data set in which each of a plurality of vibrational metrics comprise corresponding respective metric dimensions in the multidimensional data set and the process variable comprises a non-vibrational dimension in the multidimensional data set. The correlation analysis module may be operative to evaluate a plurality of vibrational metric dimensions relative to the non-vibrational dimension to determine the correlation between a given vibrational metric dimension and the non-vibrational dimension. In this regard, the correlation analysis module may perform at least one of a classification analysis or a regression analysis. The correlation analysis module may perform at least one of a non-linear least squares regression, a correlation coefficient analysis, an analysis of variance (ANOVA), k-means clustering, principal components analysis, or random forest analysis.

In an embodiment, the vibrational testing system may be operative to excite the first part at the plurality of input frequencies and measure the frequency response of the first part. The vibrational testing system may further operative to generate the vibrational data for the first part based on the measured frequency response of the first part.

In an embodiment of the tool of the second aspect, the process variable may include a manufacturing variable. The manufacturing variable may include at least one of a process temperature, a process rate, manufacturing component wear, or a raw material property. The process variable may relate to a component variable. The component variable may result from the process variable. The component variable may include at least one of a part dimension, a stress state, a crystallographic orientation, a material property, phase ratios, part chemistry, or part microstructure.

As described above, the vibrational data may include vibrational data from a batch of parts for use in a batch evaluation approach. For instance, the vibrational testing system may be operative to acquire collective vibrational data regarding a plurality of parts produced by the production part process and the response characteristic may include a metric from the collective vibrational data.

A third aspect of the present disclosure may be characterized as a method for evaluation of a plurality of parts based on vibrational data for individual parts and collective vibrational data for a batch of parts. This method may include acquiring collective vibrational data for a plurality of parts of a first production batch. The collective vibrational data includes a frequency response of individual ones of the plurality of parts when excited at a plurality of input frequencies. The method may include comparing the collective vibrational data regarding the first production batch relative to a batch sort that collectively evaluates an entirety of the first production batch and determining whether the first production batch satisfies a batch threshold relative to the entirety of the first production batch based on the batch sort.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For instance, in an embodiment, the batch threshold may relate to a total variation of the collective vibrational data for the plurality of parts of the first production batch. That is, the total amount of variation in the vibrational data (e.g., for one or more metrics of the vibration data) for a batch may be determined in relation to the individual vibrational data for given ones of the plurality of parts that comprise the batch of parts. As described below, the vibrational data for individual ones of the plurality of parts may be discounted or not considered in the collective vibrational data such that the collective vibrational data that is evaluated against the batch threshold need not include all of the vibrational data for each individual one of the plurality of parts of the batch. In other embodiments, the batch threshold may relate to a change in the collective vibrational data between the first production batch and another production batch (e.g., a given production batch may be compared to one or more prior batches).

The plurality of parts of the first production batch may correspond to a batch production process in which the plurality of parts are collectively produced in the batch production process. Alternatively, the plurality of parts of the first production batch may correspond to a given number of parts sequentially produced in a continuous production process. In this regard, the given number of parts in the batch of parts may be based on a production rate of the part production process. In an embodiment, the given number of the plurality of parts may be at least about 5, at least about 10, at least about 25, at least about 50, at least about 100, at least about 250, at least about 500, or at least about 1,000. In addition, the given number of parts may be not more than about 5,000, not more than about 2,500, not more than 2,000, not more than about 1,000, not more than about 100, not more than about 75, not more than 50, or not more than about 25, provided that the upper bound on the given number of parts is greater than the lower bound on the given number of parts.

Alternatively, the plurality of parts of the first production batch may correspond to a number of parts produced over a given time period in a continuous production process. The given time period may be based on a production rate of the part production process. In any regard, the given period of time may be at least about 1 minute (0.017 hours), at least about 5 minutes (0.083 hours), at least about 10 minutes (0.167 hours), at least about 15 minutes (0.25 hours), at least about 30 minutes (0.5 hours), at least about 1 hour, or at least about 2 hours. In addition, the given period of time may be not more than about 8 hours, not more than about 5 hours, not more than 3 hours, or not more than about 1 hour, not more than about 45 minutes (0.75 hours), not more than about 30 minutes (0.5 hours), not more than about 15 minutes (0.25 hours), or not more than about 10 minutes (0.167 hours), provided that the upper bound on the given period of time is greater than the lower bound on the period of time.

In an embodiment, the collective vibrational data may include a statistical representation of the vibrational data for the individual ones of the plurality of parts of the first production batch. For instance, the statistical representation of the vibrational data may include a standard deviation of the collective vibrational data. However, other statistical representations (e.g., mean, median, etc.) may be utilized without limitation.

The method of the third aspect may also include evaluation of individual ones of the plurality of parts. In this regard, the method may also include acquiring vibrational data for at least a first part from the first production batch. The plurality of parts may include the first part such that the first part is included in the batch. The method may further include testing the vibrational data for the first part against a sort. The sort may be based upon vibrational data from a qualification population of parts. In turn, the method may include assigning the first part to one of a compliant part classification or a non-compliant part classification based on the sort. The vibrational data for the first part may be assigned to the non-compliant classification and, as described above, may be discounted in relation to the collective vibrational data. That is, outlier parts that are classified as non-compliant, but that belong to the batch of parts may be discounted or not considered at all in the collective vibrational data.

As will be described in greater detail below, a batch of parts not satisfying the batch threshold may result in a number of possible outcomes. For instance, the plurality of parts comprising the first production batch may undergo additional testing based on the collective vibrational data failing to satisfy the batch threshold. Additionally or alternatively, the plurality of parts comprising the first production batch may be assigned to a non-compliant classification based on the collective vibrational data failing to satisfy the batch threshold.

The analysis of the collective vibrational data of the batch of parts may also allow for process feedback similar to the method of the first aspect. In this regard, the method of the third aspect may include identifying a batch response characteristic from the collective vibrational data. The batch response characteristic may be correlated to a first process variable of a part production process. The determining may include determining a state of the first process variable of the part production process based on the batch response characteristic correlated to the first process variable. In turn, the method may also include adjusting a first process control associated with the first process variable of the part production process used to produce the plurality of parts of the first production batch based on the determining. The adjusting may be at least partially based on the state of the first process variable.

In addition, the method may include process feedback based on both the collective vibrational data of the batch of parts as well as individual vibrational data for individual ones of the plurality of parts comprising the batch of parts. Accordingly, the method may include identifying a part response characteristic from vibrational data of individual ones of the plurality of parts. The part response characteristic may be correlated to a second process variable of the part production process, where the first process variable related to the batch response characteristic is different than the second process variable. The determining may include determining a state of the second process variable of the part production process based on the part response characteristic correlated to the second process variable. In turn, the method may also include adjusting a second process control associated with the second process variable of the part production process used to produce the plurality of parts of the first production batch based on the determining. In this regard, the method may include monitoring a response characteristic of the collective vibrational data for the batch of parts as well as a part response characteristic of the vibrational data of individual ones of the plurality of parts to monitor different process variables that are correlated to the batch response characteristic and the part response characteristic, respectively.

As described in relation to the first aspect, it may be preferable to identify the response characteristic (e.g., the part response characteristic or the batch response characteristic) prior to either the batch or individual ones of the parts failing to satisfy a batch threshold or being categorized as non-compliant based on a sort. As such, the adjusting may occur in response to the determining in which the first production batch satisfies the batch threshold. That is, an adjustment may occur even if the batch satisfies the batch threshold. As such, the adjusting may occur in response to a trend identified in a resonance metric of the collective vibrational data. The adjusting may occur prior to the resonance metric exceeding a limit defining a non-compliant part. Alternatively, the adjusting may occur in response to the determining in which the first production batch does not satisfy the batch threshold. That is, the adjusting may occur in the instance that the batch does not satisfy the batch threshold.

As may be appreciated, the first or the second process variable described herein in relation to the third aspect may include any of the process variables described above in relation to the first or second aspect. Further still, like in the first aspect, the vibrational data of the individual ones of the plurality of parts and/or the collective vibrational data may comprise a resonance metric. In addition, the method of the third aspect may include performing the vibrational testing on the parts such that the method includes exciting each of the plurality of parts at the plurality of input frequencies and measuring the frequency response of the each of the plurality of parts. In turn, the method may also include generating vibrational data for each of the plurality of first parts based on the measured frequency response of each respective one of the plurality of first parts. Further still, the method may include generating the collective vibrational data based on the vibrational data for each respective one of the plurality of first parts.

A fourth aspect may be characterized as a tool for evaluation of a plurality of parts based on vibrational data for individual parts and collective vibrational data for a plurality of parts. The tool includes a data store comprising collective vibrational data for a plurality of parts of a first production batch. The collective vibrational data includes a frequency response of individual ones of the plurality of parts when excited at a plurality of input frequencies. The tool also includes a batch evaluation module in operative communication with the data store to access the collective vibrational data. The batch evaluation module is operative to compare the collective vibrational data regarding the first production batch relative to a batch sort that collectively evaluates an entirety of the first production batch and determining whether the first production batch satisfies a batch threshold relative to the entirety of the first production batch based on the batch sort.

A number of feature refinements and additional features are applicable to the fourth aspect. These feature refinements and additional features may be used individually or in any combination. As such, each of the following features that will be discussed may be, but are not required to be, used with any other feature or combination of features of the fourth aspect.

For instance, the tool of the fourth aspect may be used to perform any or all of the features of the method of the third aspect. In this regard, any feature described above in relation to the method of the third aspect may be applicable to and/or performed by the tool of the fourth aspect.

Specifically, in an embodiment, the batch threshold may relate to a total variation of the collective vibrational data for the plurality of parts of the first production batch. Additionally or alternatively, the batch threshold may relate to a change in the collective vibrational data between the first production batch and another production batch.

In an embodiment, the plurality of parts of the first production batch may correspond to a batch production process in which the plurality of parts are collectively produced in the batch production process. Alternatively, the plurality of parts of the first production batch may correspond to a given number of parts sequentially produced in a continuous production process. For example, the given number of parts may be at least 10 parts or may be according to the given number of parts described above in relation to the first aspect. The given number of parts may be based on a production rate of the part production process. In still other embodiments, the plurality of parts of the first production batch may correspond to a number of parts produced over a given time period in a continuous production process. For example, the given time period may be at least 0.5 hours, or may be according to the given time period described above in relation to the first aspect. The given time period may be based on a production rate of the part production process.

The collective vibrational data may include a statistical representation of the vibrational data for the individual ones of the plurality of parts of the first production batch. For example, the statistical representation of the vibrational data comprises a standard deviation of the collective vibrational data. In other examples like those described above, any other appropriate statistical representation, mathematical operation, or any other metric may be applied to the collective vibrational data.

The tool may include a vibrational testing system that is operative to acquire vibrational data for at least a first part from the first production batch. The plurality of parts may include the first part, and the vibrational data includes the frequency response of the first part when excited at the plurality of input frequencies. The vibrational testing system may be further operative to test the vibrational data for the first part against a sort and assign the first part to one of a compliant part classification or a non-compliant part classification based on the sort. The sort may be based upon vibrational data from a qualification population of parts. In this regard, the vibrational data for the first part may be assigned to the non-compliant classification and may be discounted in relation to the collective vibrational data.

Various responses to a batch failing to satisfy the batch threshold may be provided. For instance, the plurality of parts comprising the first production batch may undergo additional testing based on the collective vibrational data failing to satisfy the batch threshold. Additionally or alternatively, the plurality of parts comprising the first production batch may be assigned to a non-compliant classification by the batch evaluation module based on the collective vibrational data failing to satisfy the batch threshold.

In an embodiment, the tool of the fourth aspect may include a correlation analysis module operative to identify a batch response characteristic from the collective vibrational data. The batch response characteristic may be correlated to a first process variable of a part production process, and the correlation analysis module may determine a state of the first process variable of the part production process based on the batch response characteristic correlated to the first process variable. In addition, the tool may include a control module operative to adjust a first process control associated with the first process variable of the part production process used to produce the plurality of parts of the first production batch based on the determining. The control module may adjust the control at least partially based on the state of the first process variable. The control module may also adjust the control in response to the batch evaluation module determining the first production batch satisfies the batch threshold. Specifically, the control module may adjust the control in response to a trend identified in a resonance metric of the collective vibrational data by the batch evaluation module. The control module may adjust the control prior to the resonance metric exceeding a boundary defining a non-compliant part. In other embodiments, the control module may adjust the control in response to the batch evaluation module determining the first production batch does not satisfy the batch threshold.

The correlation analysis module may also be operative to identify a part response characteristic from vibrational data of individual ones of the plurality of parts. The part response characteristic may be correlated to a second process variable of the part production process different than the first process variable. That is, different process variables may be monitored using batch analysis and individual part analysis, respectively. In any regard, the correlation analysis module may be operative to determine a state of the second process variable of the part production process based on the part response characteristic correlated to the second process variable. A control module of the tool may be operative to adjust a second process control associated with the second process variable of the part production process used to produce the plurality of parts of the first production batch based on the second state.

In an embodiment, at least one of the first process variable or the second process variable may comprise a manufacturing variable. The manufacturing variable may include at least one of a process temperature, a process rate, manufacturing component wear, or a raw material property. At least one of the first process variable or the second process variable may additionally or alternatively include a component variable. The component variable may result from the process variable. The component variable may include at least one of a part dimension, a stress state, a crystallographic orientation, a material property, phase ratios, part chemistry, or part microstructure.

In an embodiment, the vibrational data may include a resonance metric. The tool may also include a vibrational testing system that is operative to excite each of the plurality of parts at the plurality of input frequencies and measure the frequency response of the each of the plurality of parts. The vibrational testing system may be operative to generate vibrational data for each of the plurality of first parts based on the measured frequency response of each respective one of the plurality of first parts. The vibrational testing system may be operative to generate the collective vibrational data based on the vibrational data for each respective one of the plurality of first parts.

A fifth aspect may be characterized as a method for monitoring a part production process using vibrational data regarding parts produced by the part production process. The method includes acquiring vibrational data for each of a plurality of parts produced by the part production process. The vibrational data includes a frequency response of each of the plurality of parts when excited at a plurality of input frequencies. The method also includes generating a resonance metric from the vibrational data for each of the plurality of parts that is correlated to a process variable of the part production process. In turn, the resonance metric is monitored over the plurality of parts produced by the part production process to identify a trend in the resonance metric relative to the sequence of production of the plurality of parts. The method also includes identifying a change in the process variable associated with the trend.

A number of feature refinements and additional features are applicable to the fifth aspect. These feature refinements and additional features may be used individually or in any combination. As such, each of the following features that will be discussed may be, but are not required to be, used with any other feature or combination of features of the fifth aspect.

For instance, the trend may be indicative of a control state of the process variable. In turn, the method may also include determining an adjustment or actually adjusting a control of the part production process related to the process variable in response to the state of the process variable. The process variable may be any of the process variables described above in relation to the first aspect or the third aspect.

Moreover and as described above, the adjusting of the control of the process variable may occur prior to the resonance metric exceeding a limit relative to the resonance metric. Specifically, the limit may define at least one of a compliant part classification sort result or a non-compliant part classification sort result. In an embodiment, the limit may be a bound on the resonance metric within a compliant part classification sort result. In this regard, the identification of the trend may allow a process variable to be adjusted prior to non-compliant parts being produced.

As described above, in relation to the first aspect, the trend in the resonance metric may be measured over a given number of the plurality of parts. In this regard, the given number of parts may be according to any of the values described above in relation to the first aspect.

Further still, the method of the fifth aspect may include performing vibrational testing of the parts such that the method may also include exciting each of the plurality of parts at the plurality of input frequencies and measuring the frequency response of the each of the plurality of parts. The method may further include generating the vibrational data for each of the plurality of first parts based on the measured frequency response of each respective one of the plurality of first parts.

A sixth aspect of the disclosure may be characterized as a tool for monitoring a part production process using vibrational data regarding parts produced by the part production process. The tool includes a data store comprising vibrational data for each of a plurality of parts produced by the part production process. The vibrational data includes a frequency response of each of the plurality of parts when excited at a plurality of input frequencies. The tool also includes a vibration evaluation module operative to access the data store to retrieve the vibrational data. The vibration evaluation module is operative to generate a resonance metric from the vibrational data for each of the plurality of parts that is correlated to a process variable of the part production process, monitor the resonance metric over the plurality of parts produced by the part production process to identify a trend in the resonance metric relative to the sequence of production of the plurality of parts, and identify a change in the process variable associated with the trend.

A number of feature refinements and additional features are applicable to the sixth aspect. These feature refinements and additional features may be used individually or in any combination. As such, each of the following features that will be discussed may be, but are not required to be, used with any other feature or combination of features of the sixth aspect.

For instance, the tool of the sixth aspect may be used to perform any or all of the features of the method of the fifth aspect. In this regard, any feature described above in relation to the method of the fifth aspect may be applicable to and/or performed by the tool of the sixth aspect.

Additionally, in an embodiment, of the tool of the sixth aspect, the trend may be indicative of a state of the process variable. In turn, the tool may also include a control module that may be operative to determine an adjustment to a control of the part production process related to the process variable in response to the state of the process variable. The control module may be operative to adjust the control in response to the process variable.

In an embodiment, the process variable may include a manufacturing variable. The manufacturing variable may include at least one of a process temperature, a process rate, manufacturing component wear, or a raw material property. Additionally or alternatively, the process variable may relate to a component variable. The component variable may result from the process variable. The component variable may include at least one of a part dimension, a stress state, a crystallographic orientation, a material property, phase ratios, part chemistry, or part microstructure.

In an embodiment, the control module may adjust the control prior to the resonance metric exceeding a limit relative to the resonance metric. The limit may define at least one of a compliant part classification sort result or a non-compliant part classification sort result. The limit may include a bound on the resonance metric within a compliant part classification sort result. In this regard, the bound may allow for the limit to be exceeded to provide for control of the process variable without parts being categorized as non-compliant.

The trend in the resonance metric may be measured over a given number of the plurality of parts. In an embodiment, the given number of the plurality of parts may be at least 10 parts or according to the definition provided above in relation to the first aspect. Additionally, the given number of the plurality of parts may be based on a production rate of the part production process. Alternatively, the trend in the reasoned metric may be measured over a given time period in which the plurality of parts are produced. The given time period may be at least 0.5 hours or according to the definition provided above in relation to the first aspect. The given time period may be based on a production rate of the part production process.

The tool may also include a vibrational testing system operative to excite each of the plurality of parts at the plurality of input frequencies and measuring the frequency response of the each of the plurality of parts. The vibrational testing system may be operative to generate the vibrational data for each of the plurality of first parts based on the measured frequency response of each respective one of the plurality of first parts.

A seventh aspect may be characterized as a method for use in vibrational testing of parts. The method includes acquiring vibrational data for each of a plurality of parts produced by a part production process. The vibrational data includes a frequency response of each of the plurality of parts when excited at a plurality of input frequencies. The method also includes generating a plurality of resonance metrics from the vibrational data. The method includes obtaining process variable values for a process variable for each of the plurality of parts and identifying a correlation between the process variable and a correlated resonance metric from the plurality of resonance metrics.

A number of feature refinements and additional features are applicable to the seventh aspect. These feature refinements and additional features may be used individually or in any combination. As such, each of the following features that will be discussed may be, but are not required to be, used with any other feature or combination of features of the seventh aspect.

For instance, as described above in relation to the determination of a correlation between a response characteristic and a process variable in the first aspect, identifying the correlation may include evaluation relative to a multidimensional data set in which each of the plurality of vibrational metrics comprise corresponding respective vibrational metric dimensions in the multidimensional data set and the process variable comprises a non-vibrational dimension in the multidimensional data set. The identifying the correlation may also include evaluating a plurality of vibrational metric dimensions relative to the non-vibrational dimension to determine the correlation between a given resonance metric dimension and the non-vibrational dimension. The evaluation may include at least one of a classification analysis or a regression analysis such as, for example, at least one of a non-linear least squares regression, a correlation coefficient analysis, an analysis of variance (ANOVA), k-means clustering, principal components analysis, or random forest analysis.

Further still, the method of the seventh aspect may include vibrational testing of the parts. As such, the method may include exciting the first part at the plurality of input frequencies and measuring the frequency response of the first part. The method may further include generating the vibrational data for the first part based on the measured frequency response of the first part. The process variable of the seventh aspect may be according to any of the process variables described above in relation to the first aspect.

The method of the seventh aspect may also include controlling the part production process to vary the process variable such that at least two of the plurality of parts have different process variable values. This may allow variation in the process variable such that a response characteristic may be identified from the vibrational data.

Further still, the method of the seventh aspect may facilitate evaluation of a change in a default part production process. Accordingly, the method may include modifying the part production process from a default part production process to a test part production process to generate a plurality of test parts using the test part production process. The test part production process comprises a change in relation to at least the process variable. In turn, the method may include monitoring the correlated resonance metric for each of the plurality of test parts in relation to a sort to assign each of the plurality of test parts to one of a compliant part classification or a non-compliant classification based on the sort. The method may include evaluating the test part production process in relation to the assignment of the plurality of test parts to the compliant part classification or the non-compliant part classification.

In addition to evaluation of individual ones of a plurality of test parts, the evaluation of the test part production process may involve batch testing. As such, the method may also include comparing collective vibrational data regarding the plurality of test parts that comprise a test batch relative to a batch sort that evaluates an entirety of the test batch and determining whether the test batch satisfies a batch threshold relative to the entirety of the test batch based on the batch sort. The batch threshold may relate to the correlated resonance metric.

An eighth aspect of the disclosure may be characterized as a tool for use in identifying a correlation between vibrational data regarding at least one part and a process variable used to manufacture the at least one part. The tool includes a data store comprising vibrational data for each of a plurality of parts produced by a part production process. The vibrational data includes a frequency response of each of the plurality of parts when excited at a plurality of input frequencies. The tool also includes a correlation analysis module operative to generate a plurality of resonance metrics from the vibrational data, obtaining process variable values for a process variable for each of the plurality of parts, and identify a correlation between the process variable and a correlated resonance metric from the plurality of resonance metrics.

A number of feature refinements and additional features are applicable to the eighth aspect. These feature refinements and additional features may be used individually or in any combination. As such, each of the following features that will be discussed may be, but are not required to be, used with any other feature or combination of features of the eighth aspect.

For instance, the tool of the eighth aspect may be used to perform any or all of the features of the method of the seventh aspect. In this regard, any feature described above in relation to the method of the seventh aspect may be applicable to and/or performed by the tool of the eighth aspect.

Additionally, in relation to the operation of the correlation analysis module, the correlation analysis module may be operative to prepare a multidimensional data set in which each of the plurality of vibrational metrics comprise corresponding respective vibrational metric dimensions in the multidimensional data set and the process variable comprises a non-vibrational dimension in the multidimensional data set. The correlation analysis module may evaluate a plurality of vibrational metric dimensions relative to the non-vibrational dimension to determine the correlation between a given resonance metric dimension and the non-vibrational dimension. In this regard, the correlation analysis module may execute at least one of a classification analysis or a regression analysis. Specifically, the correlation analysis module may execute at least one of a non-linear least squares regression, a correlation coefficient analysis, an analysis of variance (ANOVA), k-means clustering, principal components analysis, or random forest analysis.

In an embodiment, the tool may include a vibrational testing system operative to excite the first part at the plurality of input frequencies and measure the frequency response of the first part. The vibrational testing system may generate the vibrational data for the first part based on the measured frequency response of the first part.

Additionally, in an embodiment, the process variable may include a manufacturing variable. The manufacturing variable may include at least one of a process temperature, a process rate, manufacturing component wear, or a raw material property. Additionally or alternatively, the process variable may relate to a component variable. The component variable may result from the process variable. The component variable may include at least one of a part dimension, a stress state, a crystallographic orientation, a material property, phase ratios, part chemistry, or part microstructure.

Further still, the tool may include a control module that is operative to control the part production process to vary the process variable such that at least two of the plurality of parts have different process variable values. The control module may be operative to modify the part production process from a default part production process to a test part production process to generate a plurality of test parts using the test part production process. The test part production process comprises a change in relation to at least the process variable. In turn, the vibrational testing system may be operative to monitor the correlated resonance metric for each of the plurality of test parts in relation to a sort to assign each of the plurality of test parts to one of a compliant part classification or a non-compliant classification based on the sort. The correlation analysis module may be operative to evaluate the test part production process in relation to the assignment of the plurality of test parts to the compliant part classification or the non-compliant part classification.

Additionally, the vibrational testing system may include a batch evaluation module that is operative to compare collective vibrational data regarding the plurality of test parts that comprise a test batch relative to a batch sort that evaluates an entirety of the test batch and determine whether the test batch satisfies a batch threshold relative to the entirety of the test batch based on the batch sort. The batch threshold may relate to the correlated resonance metric.

A ninth aspect of the present disclosure may be characterized as a method for evaluation of a change in a part production process that includes modifying a part production process from a default part production process to a test part production process to generate a plurality of test parts using the test part production process. The test part production process includes a change in relation to at least one process variable of the part production process. In turn, the method includes acquiring vibrational data regarding the plurality of test parts produced by the test part production process. The vibrational data includes a frequency response of the plurality of test parts when excited at a plurality of input frequencies. The method also includes comparing the vibrational data regarding the plurality of test parts produced by the test part production process to qualification vibrational data from a qualification population of parts and evaluating the test part production process based on the comparing.

A number of feature refinements and additional features are applicable to the ninth aspect. These feature refinements and additional features may be used individually or in any combination. As such, each of the following features that will be discussed may be, but are not required to be, used with any other feature or combination of features of the ninth aspect.

For example, in an embodiment, the vibrational data may include the frequency response of each one of the plurality of test parts. The method may also further include testing the vibrational data for each one of the plurality of test parts against a sort. The sort may be based upon the qualification vibrational data from the qualification population of parts. In turn, the method may include assigning each one of the plurality of test parts to one of a compliant part classification or a non-compliant classification based on the sort. Accordingly, the evaluating of the test part production method may be at least in part based on the assigning. Further still, the evaluation of the test part production method may involve a batch evaluation such that the vibrational data comprises collective vibrational data regarding a test production batch comprising the plurality of test parts. In turn, the method may include testing the collective vibrational data for the test part batch against a batch sort that collectively evaluates an entirety of the test production batch and determining whether the test production batch satisfies a batch threshold relative to the entirety of the test production batch based on the batch sort. As such, the evaluating may be at least in part based on the determining.

The test part production process may include a change to a process variable of the part production process relative to the default part production process. The process variable may be according to the description of the process variable provided above in relation to the first aspect. The process variable may be correlated to a response characteristic in the vibrational data. In turn, the comparing may include comparing the response characteristic of the vibrational data regarding the plurality of test parts to the response characteristic of the qualification population of parts. The vibrational data may include resonance response data and the response characteristic corresponds to a resonance metric based on the resonance response data.

A tenth aspect may be characterized as a tool for evaluation of a change in a part production process. The tool includes a control module that is operative to modify a part production process from a default part production process to a test part production process to generate a plurality of test parts using the test part production process. The test part production process comprises a change in relation to at least one process variable of the part production process. The tool also includes a data store comprising vibrational data regarding the plurality of test parts produced by the test part production process. The vibrational data includes a frequency response of the plurality of test parts when excited at a plurality of input frequencies. The tool also includes a vibrational testing system operative to compare the vibrational data regarding the plurality of test parts produced by the test part production process to qualification vibrational data from a qualification population of parts and evaluate the test part production process based on the comparing.

A number of feature refinements and additional features are applicable to the tenth aspect. These feature refinements and additional features may be used individually or in any combination. As such, each of the following features that will be discussed may be, but are not required to be, used with any other feature or combination of features of the tenth aspect.

For instance, the tool of the tenth aspect may be used to perform any or all of the features of the method of the ninth aspect. In this regard, any feature described above in relation to the method of the ninth aspect may be applicable to and/or performed by the tool of the tenth aspect.

Additionally, the vibrational data includes the frequency response of each one of the plurality of test parts. The vibrational testing system may be operative to test the vibrational data for each one of the plurality of test parts against a sort and assign each one of the plurality of test parts to one of a compliant part classification or a non-compliant classification based on the sort. The sort may be based upon the qualification vibrational data from the qualification population of parts. In turn, the vibrational testing system may evaluate the test part production process at least in part based on the assigning.

In an embodiment, the vibrational data may include or define collective vibrational data regarding a test production batch comprising the plurality of test parts. In turn, the tool may further include a batch evaluation module operative to test the collective vibrational data for the test part batch against a batch sort that collectively evaluates an entirety of the test production batch and determine whether the test production batch satisfies a batch threshold relative to the entirety of the test production batch based on the batch sort. The vibrational testing system may be operative to evaluate the test part production process at least in part based on the batch evaluation module determining whether the test production batch satisfies a batch threshold relative to the entirety of the test production batch based on the batch sort.

In an embodiment, the control module may change a process variable of the part production process relative to the default part production process to perform the test part production process. The process variable may be correlated to a response characteristic in the vibrational data, and the vibrational testing system may compare the response characteristic of the vibrational data regarding the plurality of test parts to the response characteristic of the qualification population of parts. The vibrational data may include resonance response data and the response characteristic corresponds to a resonance metric based on the resonance response data.

DETAILED DESCRIPTION

Figure 1:
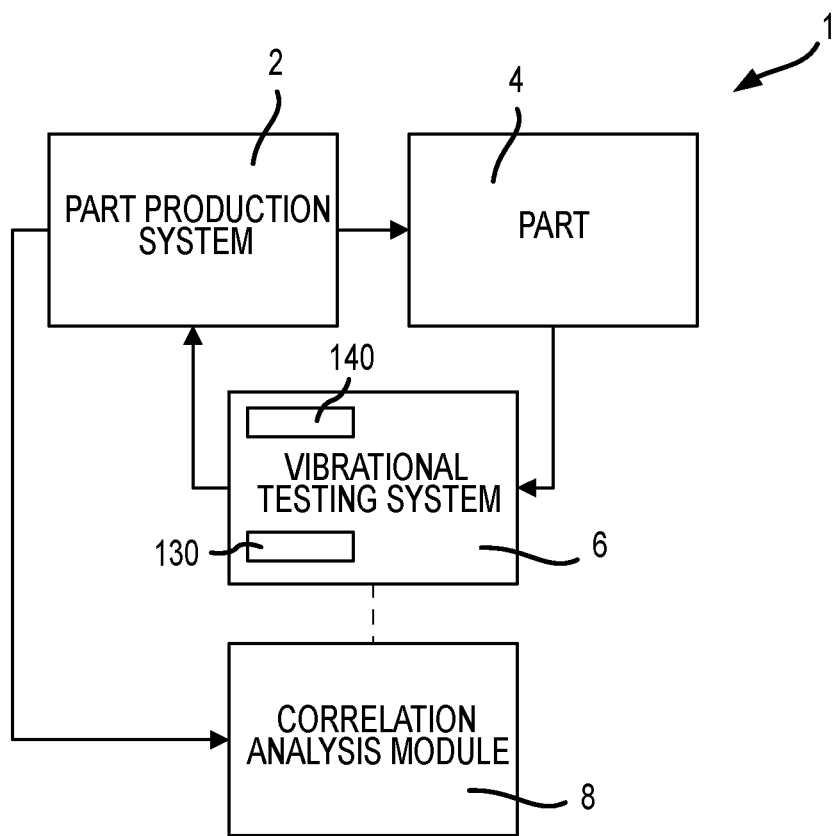
FIG. 1 is a schematic view of an embodiment of a process control system that may be useful for generation of process feedback data based on a vibrational analysis of parts produced by a part production system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 depicts an embodiment of a process control system 1. The process control system 1 may include a part production system 2. As will be described in greater detail below, the part production system 2 may perform a part production process to produce one or more parts 4. As may be appreciated, the part production system 2 may be used to produce a plurality of parts 4. As used herein, a single part 4 or a plurality of parts 4 may be referenced, all of which may be produced by a part production process of the part production system 2 unless otherwise specified, although production of various parts 4 may occur at different times using different process variables of the part production process.

The process control system 1 may also include a vibrational testing system 6 that may test the one or more parts 4 and may provide feedback to the part production system 2. As further depicted in FIG. 1, the process control system 1 may include a correlation analysis module 8 that may be in operative communication with the vibrational testing system 6 to obtain frequency responses determined by the vibrational testing system 6 corresponding to tested parts 4. The correlation analysis module 8 may also be in operative communication with the part production system 2 to obtain process variable information regarding the production of parts 4. In turn, the correlation analysis module 8 may be operative to determine correlations between the frequency responses of parts 4 and the part production process carried out by the part production system 2. Various embodiments are described below that may relate to features and/or performance of individual ones of the components of the process control system 1. Furthermore, the discussion below describes features and/or performance of components of the process control system 1 collectively. In this regard, the discussion that follows is illustrative of embodiments of a process control system 1 and the individual components thereof. As will be appreciated in the following discussion, various embodiments of a tool for use in providing process control feedback may include one or more components of the system.

Specifically, the vibrational testing system 6 may be operative to excite a part 4 to collect a vibrational response thereof as vibrational data regarding the part 4. The vibrational testing of the part 4 may comprise a resonance inspection of the part 4. Various applications of resonance inspection (e.g., resonance ultrasound spectroscopy; process compensated resonance testing) are addressed herein. Various principles that may relate to resonance inspection are addressed in the following U.S. patents, the entire disclosures of which are incorporated by reference in their entirety herein: U.S. Pat. Nos. 5,408,880; 5,425,272; 5,495,763; 5,631,423; 5,641,905; 5,837,896; 5,866,263; 5,952,576; 5,965,817; 5,992,234; and 6,199,431.

Figure 2:
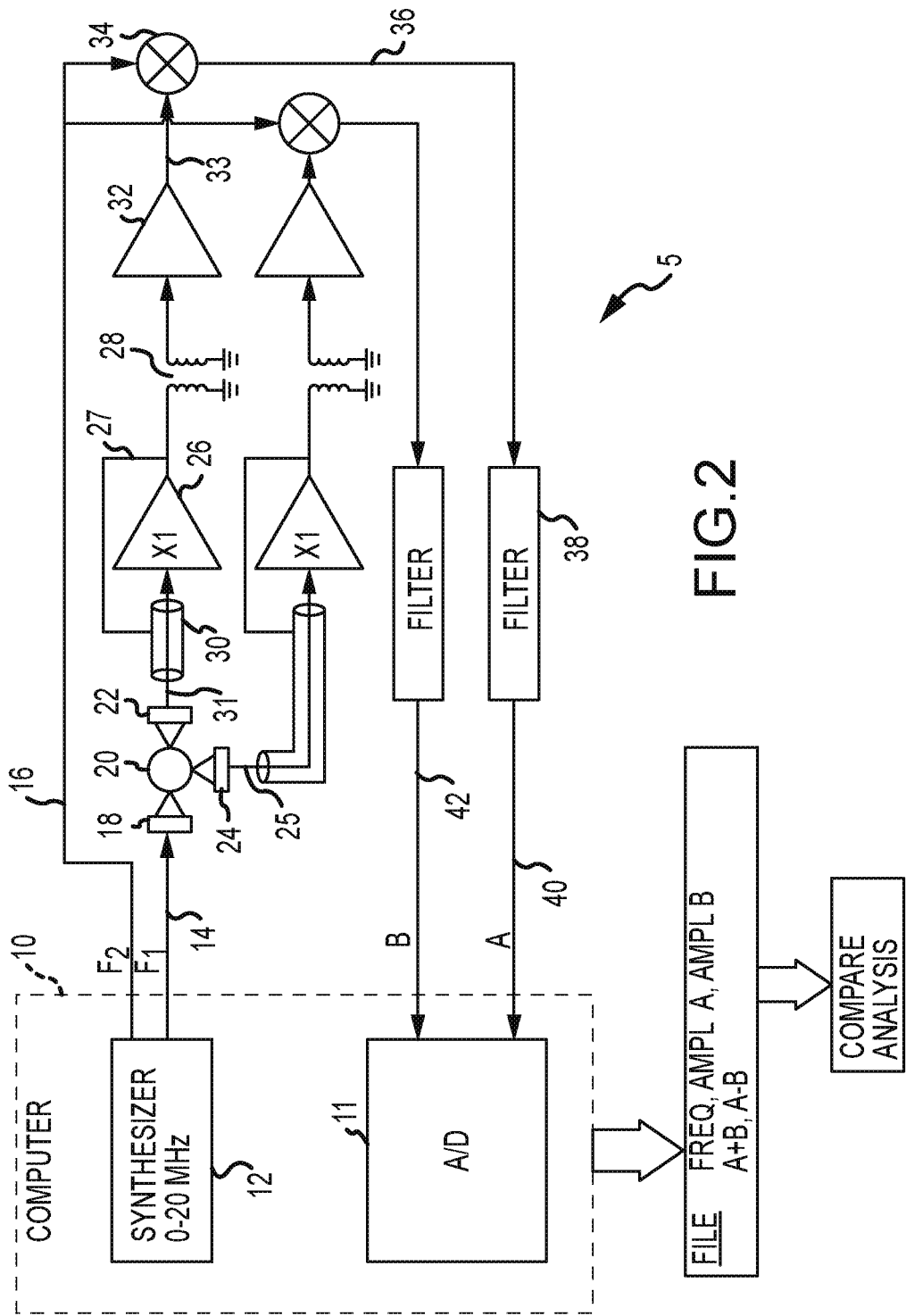
FIG. 2 is a block-diagram of one embodiment of a vibrational testing system.
Figure 3:
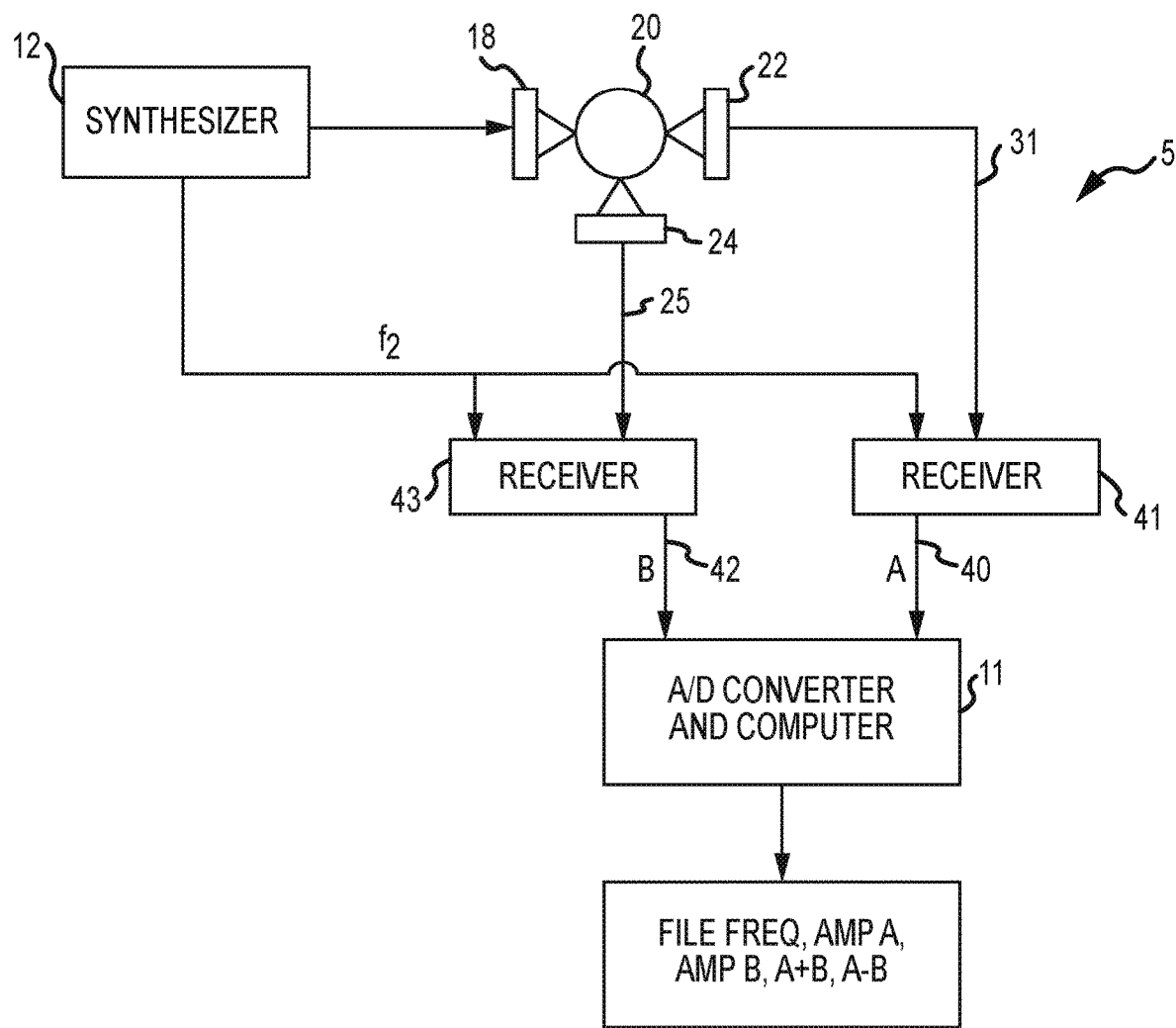
FIG. 3 shows a simplified block diagram of the vibrational testing system of FIG. 1.

One embodiment of a resonance inspection tool or system 5 (e.g., for accommodating resonant ultrasound spectroscopy measurement with a plurality of sensors; for process compensated resonance testing) is illustrated in FIGS. 2 and 3. As may be appreciated, the resonance inspection tool 5 may comprise the vibrational testing system 6 of FIG. 1, although in other embodiments of the process control system 1 any appropriate vibrational testing system 6 may be used without limitation. The resonance inspection tool 5 includes a computer 10 that provides for control of a synthesizer 12 and an analog to digital converter 11 for each data input channel connected to each receiving or response transducer 22, 24 of the resonance inspection tool 5. Transducer 22 has an output on line 31, while transducer 24 has an output on line 25.

Synthesizer 12 may have a frequency range from greater than 0 to 20 MHz. Other frequency ranges may be appropriate. Synthesizer 12 provides two outputs which are the frequency F1 at output 14 and a second output which is the frequency F2 at line 16. In one embodiment, the frequency F2 is either F1 plus a constant frequency such as 1000 Hz for heterodyne operation of the receiver, or at F1 for homodyne operation. A first transducer 18 (e.g., the input or driving transducer) is excited at a frequency F1 by synthesizer 12. Transducer 18 provides vibration (e.g., ultrasonic) to an object 20 to be tested via resonance inspection.

The response of the object 20 is then received by two separate output transducers 22 and 24. The circuitry from the output transducer 22 and A/D converter 11 can be identical to circuitry between output transducer 24 and A/D converter 11. For this reason, only the circuitry between output transducer 22 and A/D converter 11 will be discussed below. The times one (×1) amplifier 26 is connected to the output transducer 22, provides current for transformer 28, and has a feedback 27.

Figure 4:
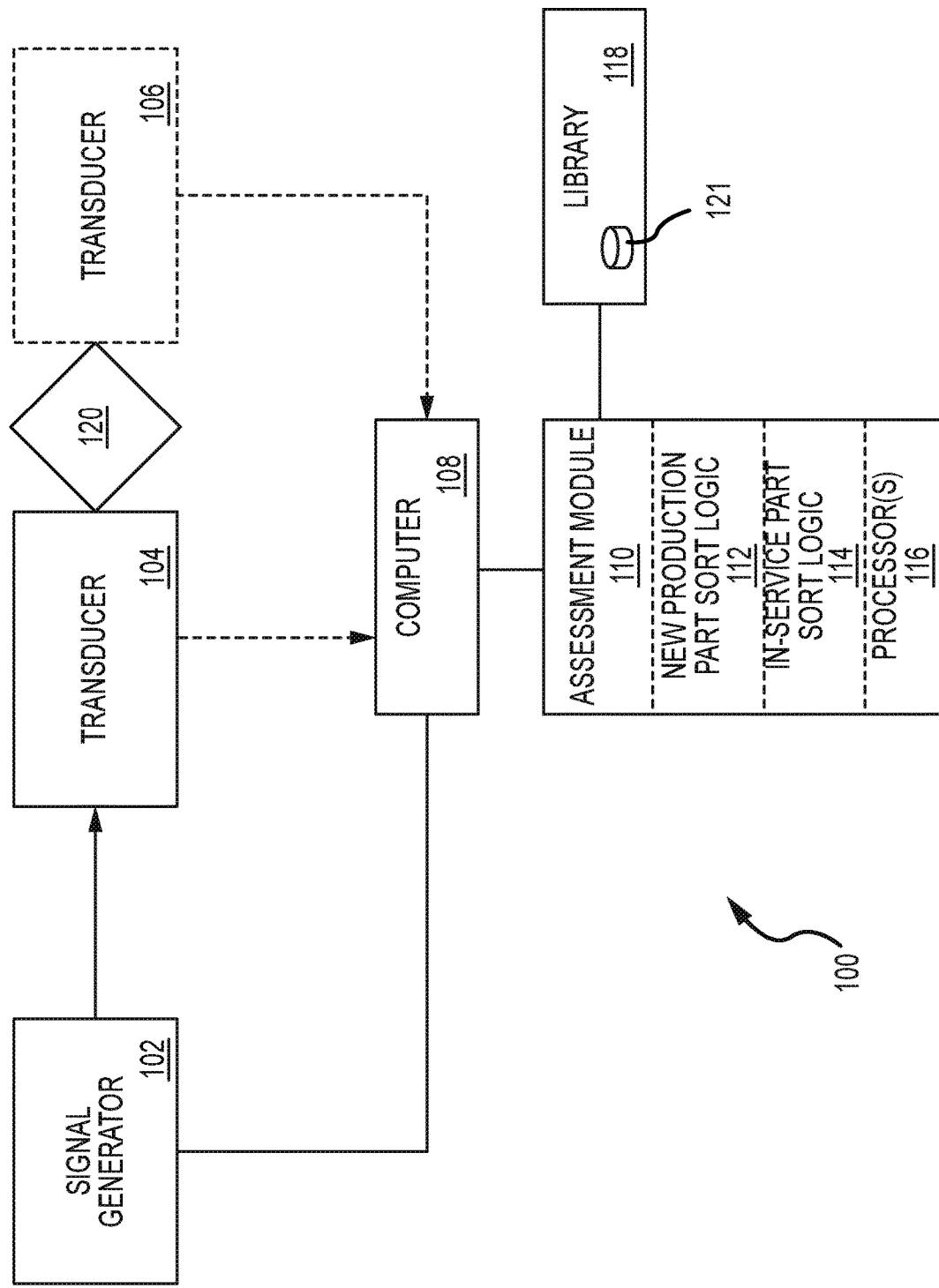
FIG. 4 is a block-diagram of another embodiment of a vibrational testing system.

The output of transducer 22 is connected to a receiver 41 (FIG. 3). Receiver 41 is used for the purpose of providing amplification and noise rejection in the circuit between output transducer 22 and A/D converter 11. The output A (line 40) is applied to the A/D converter 11 within the computer 10. The A/D converter 11 provides an A/D conversion for each of lines 40 and 42. The converted information is then entered into a file which consists of the measured frequency, the amplitude of A, the amplitude of B, the amplitude of A plus B, and the amplitude of A minus B. This file is then used for further analysis of the spectrum to determine characteristics of a part 20 being tested. The file may be stored in a data store comprising a physical memory device 121 (FIG. 4). In other embodiments, the file stored in the data store may include any appropriate vibrational data obtained from vibrational testing (e.g., using the vibrational testing system 6 including raw vibrational data and/or vibrational data metrics obtained from the raw vibrational data.

The times one (×1) amplifier 26 provides feedback to an inner coaxial cable shield 30 which surround the lead from transducer 22 to amplifier 26. Shield 30 is another grounded shield which can also be used for noise suppression. The outer surrounding coaxial cable is not shown in FIG. 2. If lead 31 is short, the shield 30 may be omitted because capacitance will not be too large. The purpose of the inner shield 30 is to provide a cancellation of capacitance of the lead 31. The transformer 28 may be a 4:1 step-down transformer used for impedance matching to the input of amplifier 32. In this regard, it should be noted that the output impedance of amplifier 26 may be much lower than the output impedance of transducer 22. This provides for the power gain and the necessary feedback to shield 30. The amplifier 32 may have a gain factor of 100:1 or a 40 db gain. Other gain factors may be appropriate. The amplifier 26 may be a broad-band amplifier having a band pass on the order of 50 MHz.

Mixer 34 has an output signal (e.g., a 1 KHz signal) having a magnitude which is proportional to the magnitude of the frequency F1 provided on line 14 from synthesizer 12. The function of the synthesizer 12 is to provide a point-by-point multiplication of instantaneous values of inputs on lines 16 and 33. The mixer 34 also has many high frequency output components which are of no interest. The high frequency components are therefore filtered out by the low-band pass filter 38 which is connected to mixer 34 by line 36. Filter 38 serves to clean-up the signal from mixer 34 and provide a voltage on line 40 which is only the output signal at an amplitude which is proportional to the amplitude of the output 31 of transducer 22.

Operation of the resonance inspection tool 5 will be briefly described in relation to measurement steps performed by measurement of the output of either transducer 22 or transducer 24 controlled by computer 10. A measurement cycle may be initiated, and provides initialization for the frequency F and the desired frequency step. The frequency step may be 1 Hz or any other frequency selected for the measurement. Although a constant frequency step may be utilized, the frequency step may be determined by any appropriate algorithm. In one embodiment, the frequency step is determined by determining the start frequency and the stop frequency, and dividing the frequency difference by the number of steps desired for the measurement. In any case, the synthesizer 12 is configured to provide a plurality of input or drive frequencies to transducer 18.

Once a signal is picked up by the receiver (i.e., an output on line 33), a pause for ring delay there is a provided. The pause for ring delay may be on the order of 30 milliseconds, although other ring delays can be used if the object under test 20 has resonances that are narrower than a few hertz. The purpose of the pause is to give the object 20 an opportunity to reach its steady state magnitude in response to a steady input from transducer 18. The pause time is time after the frequency is applied and before detection is initiated.

After the ring delay is complete, analog-to-digital converter 11 provides an output that can be used by the data recording computer. The output of the A/D conversion is then written to a file by the computer 10 for the purpose of analysis of the data by another program or storage in the data store of the physical memory device 121. This data may be referred to herein as vibrational data. Vibrational data comprising the unique signature or characterizing of the object 20 is written into file as it is created. Reading may be stopped when a read frequency is present and step 66 stops the program. Once information is entered into file, subsequent processing can be used to generate one or more vibrational metrics that may, for example, include a signature or characterize the object 20. Examples of vibrational metrics (which may include, but are not limited to, metrics related to the resonance response of the object 2A or "personal metrics") may include, but are not limited to, vibration (resonant) magnitudes, the sum of resonant magnitudes, the difference of vibration (resonant) magnitudes, or other manipulations of the multiple channel multiple frequency measurement which is used to perform the unique signature of the object 20. The magnitude of the outputs at each sensor location for each resonance frequency may be compared.

Another embodiment of a resonance inspection tool or system is illustrated in FIG. 4 and is identified by reference numeral 100. In an embodiment, the resonance inspection tool 100 may comprise the vibrational testing system 6 of FIG. 1. The resonance inspection tool 100 may be used to assess a part or part-under-test 120. This part 120 may be retained in a fixture 119 in any appropriate manner for execution of a resonance inspection.

The resonance inspection tool 100 includes a signal generator 102 of any appropriate type, at least one transducer (e.g., transducer 104), and a computer 108. The transducer 104 may be of any appropriate type. In one embodiment, the transducer 104 is in physical contact with the part 120 throughout execution of the inspection of the part 120, and in this case, may be characterized as being part of the fixture 119 for the part 120. Another embodiment has the transducer 104 being maintained in spaced relation to the part 120 throughout execution of the resonance inspection of the part 120 (e.g., a laser, such as Nd:YAG lasers, TEA CO2 lasers, excimer lasers, or diode lasers).

The computer 108 may include what may be characterized as a vibrational or resonance assessment module 110 (e.g., incorporated/embodied by a non-transitory computer-readable storage medium). Generally, the resonance assessment module 110 may be configured to evaluate the results of a resonance inspection, for instance for purposes of determining whether the part 120 should be accepted or rejected by the resonance inspection tool 100, determining whether the part 120 is at an end-of-life state or condition, or the like. A part 120 that is "accepted" by the resonance inspection tool 100 may mean that the resonance inspection tool 100 has determined that the part 120 may be put into service (e.g., utilized for its intended purpose(s) and/or used according to its design specifications). In one embodiment, a part 120 that has been accepted by the resonance inspection tool 100 means that the tool 100 has determined that the part 120 is free of defects, is not in an end-of-life condition or state, is aging normally, or any combination thereof. A part 120 that is "rejected" by the resonance inspection tool 100 may mean that the resonance inspection tool 100 has determined that the part 120 should not be put into service (e.g., should not be utilized for its intended purpose(s) and/or should no longer be used according to its design specifications). In one embodiment, a part 120 that has been rejected by the resonance inspection tool 100 means that the tool 100 has determined that the part 120 includes at least one defect, is at or near an end-of-life condition or state, is aging abnormally, or any combination thereof. A part 120 that is analyzed or assessed by the resonance inspection tool 100 may be of any appropriate size, shape, configuration, type, and/or class. For example, the part 120 may comprise a new production part—a newly manufactured part that have not yet been released from production (e.g., a part that have not been shipped for use by an end user or customer). New production parts include parts that may have undergone at least some post-production testing of any appropriate type (including without limitation a resonance inspection).

The signal generator 102 generates signals that are directed to the transducer 104 for transmission to the part 120 in any appropriate manner/fashion (e.g., via physical contact between the transducer 104 and the part 120; through a space between the transducer 104 and the part 120). Signals provided to the transducer 104 by the signal generator 102 are used to mechanically excite the part 120 (e.g., to provide energy to the part 120 for purposes of inducing vibration). Multiple frequencies may be input to the part 120 through the transducer 104 in any appropriate manner. This may be characterized as "sweeping" through a range of frequencies that are each input to the part 120, and this may be done in any appropriate manner for purposes of the resonance inspection tool 100. Any appropriate number/range of frequencies may be utilized, and any appropriate way of progressing through a plurality of frequencies (e.g., a frequency range) may be utilized by the resonance inspection tool 100.

In one embodiment, at least one other transducer 106 is utilized in the resonance inspection of the part 120 using the resonance inspection tool 100 of FIG. 4, including where two transducers 106 are utilized (e.g., in accordance with the embodiment of FIGS. 2 and 3 noted above). Each of the transducers 106, as well as the input or drive transducer 104, may be in physical contact with the part 120. It may be such that the part 120 is in fact entirely supported by the transducer 104 and any additional transducers 106 (e.g., the drive transducer 104 and one or more receive transducers 106 may define the fixture 119). Each transducer 106 that is utilized by the resonance inspection tool 100 is used to acquire the frequency response of the part 120 to the frequencies input to the part 120 by the drive transducer 104, and therefore each transducer 106 may be characterized as an output or receiver transducer 106. The frequency response may be measured as vibrational data that is descriptive of the frequency response of the part 120.

One or more transducers 106 utilized by the resonance inspection tool 100 may be maintained in physical contact with the part 120 throughout the resonance inspection. Another option is for one or more of the transducers 106 to be maintained in spaced relation with the part 120 throughout the resonance inspection. A transducer 106 in the form of a laser may be maintained in spaced relation with the part throughout the resonance inspection, and may be utilized to obtain the frequency response of the part 120 to generate vibrational data descriptive of the frequency response. Representative lasers that may be utilized as a transducer 106 by the resonance inspection system 100 include without limitation Nd:YAG lasers, TEA CO2 lasers, excimer lasers, or diode lasers. In one embodiment, the frequency response of the part 120 is acquired by laser vibrometry utilizing at least one transducer 106. A given transducer 106 in the form of a laser may acquire resonance data on the part 120 from a single location, or a given transducer 106 in the form of a laser could acquire resonance data on the part 120 by scanning the laser over multiple locations on the part 120.

Another embodiment of the resonance inspection tool 100 of FIG. 4 utilizes only the transducer 104. That is, no additional transducers 106 are utilized by the resonance inspection tool 100 in this case, and therefore the transducer 106 is presented by dashed lines in FIG. 4. In this case, the transducer 104 is used to input a drive signal to the part 120 (e.g., to excite the part 120 at a plurality of different frequencies), and is also used to acquire the frequency response of the part 120 to these input drive frequencies to generate the vibrational data for the part 120 that describes the frequency response of the part 120. Representative configurations for this drive/receive transducer configuration 104 include without limitation piezoceramic, piezocomposites, piezoelectric quartz crystal, and other electromechanical materials.

In the above-noted drive/receive transducer configuration 106, a first drive signal at a first frequency (from the signal generator 102) may be transmitted to the part 120 through the transducer 104, the transmission of this first drive signal may be terminated, and the transducer 104 may be used to acquire a first frequency response of the part 120 to this first drive signal (including while a drive signal is being transmitted to the part 120). The signal generator 102 may also be used provide a second drive signal at a second frequency to the transducer 104, which in turn transmits the second drive signal to the part 120, the transmission of this second drive signal may be terminated, and the transducer 104 may once again be used to acquire a second frequency response of the part 120 to this second drive signal (including while a drive signal is being transmitted to the part 120). This may be repeated any appropriate number of times and utilizing any appropriate number of frequencies and frequency values. In this regard, the first frequency response, the second frequency response, and any further frequency response may comprise the vibrational data for the part. One or more drive signals may be sequentially transmitted to the part 120 by the signal generator 102 and transducer 104, one or more drive signals may be simultaneously transmitted to the part 120 by the signal generator 102 and transducer 104, or any combination thereof.

The frequency response of the part 120 is transmitted to the computer 108 of the resonance inspection tool 100 of FIG. 4 to generate and/or store the vibrational data regarding the part 120. This computer 108 may be of any appropriate type and/or configuration, and is used by the resonance inspection tool 100 to evaluate the part 120 in at least some fashion (e.g., to determine whether to accept or reject the part 120). Generally, the part 120 is vibrated by the transducer 104 according to a predetermined signal(s), and the part 120 is evaluated by the resulting vibrational (e.g., whole body) response of the part 120. For instance, this evaluation may entail assessing the part 120 for one or more defects of various types, assessing whether the part 120 is at or near the end of its useful, life, assessing whether the part 120 is aging normally or abnormally, or any combination thereof. Further still, the evaluation may entail assessing the part production process used to produce the part as will be described in greater detail below. In any record, the vibrational data may be stored in a data store comprising a physical memory device 121.

The computer 108 may incorporate and utilize the above-noted resonance assessment module 110 to evaluate the response of the part 120 to a resonance inspection. The resonance assessment module 110 may be of any appropriate configuration and may be implemented in any appropriate manner. In one embodiment, the resonance assessment module 110 includes at least one part sort logic 112 (e.g., logic configured to determine whether to accept or reject parts) along with one or more processors 116 of any appropriate type and which may be implemented in any appropriate processing architecture. The assessment of the response of the part 120 to the input drive signals may entail comparing the response to a library 118 utilized by the resonance inspection tool 100. This library 118 may be stored on a computer-readable storage medium 121 of any appropriate type or types and in a non-transitory form (e.g., a non-transitory computer-readable storage medium), including without limitation by using one or more data storage devices of any appropriate type and utilizing any appropriate data storage architecture. As may be appreciated, both the vibrational data for the part under test and the comparative resonance data may both be stored in the library 118 that is accessible by the resonance inspection tool 100. While one physical storage device 114 is shown, additional physical storage devices may be provided without limitation.

The library 118 of the resonance inspection tool 100 may include various types of resonance inspection results to allow the resonance inspection tool 100 to assess a part 120. Generally, the resonance inspection results from the part 120 are compared with comparative resonance data in the library 118 from at least one other part that is the same as the part 120 in one or more respects (e.g., a part 120 in the form of a turbine blade will be compared to turbine blade data in the library 118; a part 120 in the form of a turbine blade will not be compared with ball bearing data in the library 118). The library 118 may include vibrational data from a qualification population of parts that are classified as acceptable or compliant. In this regard, a sort to evaluate a part 120 may include evaluating the vibrational data for the part 120 to the vibrational data of the qualification population of parts. For instance, representative resonance inspection results are presented in FIG. 5, and are of a type that may be included in the library 118. The three spectra 122 shown in FIG. 5 may represent the frequency response of a part 120 or collection of qualification parts 120 that have been determined to be acceptable. This may define a classification of compliant parts. Note how the three peaks 128a, 128b, and 128c differ in at least one respect between the various spectra 122.

Figure 5:
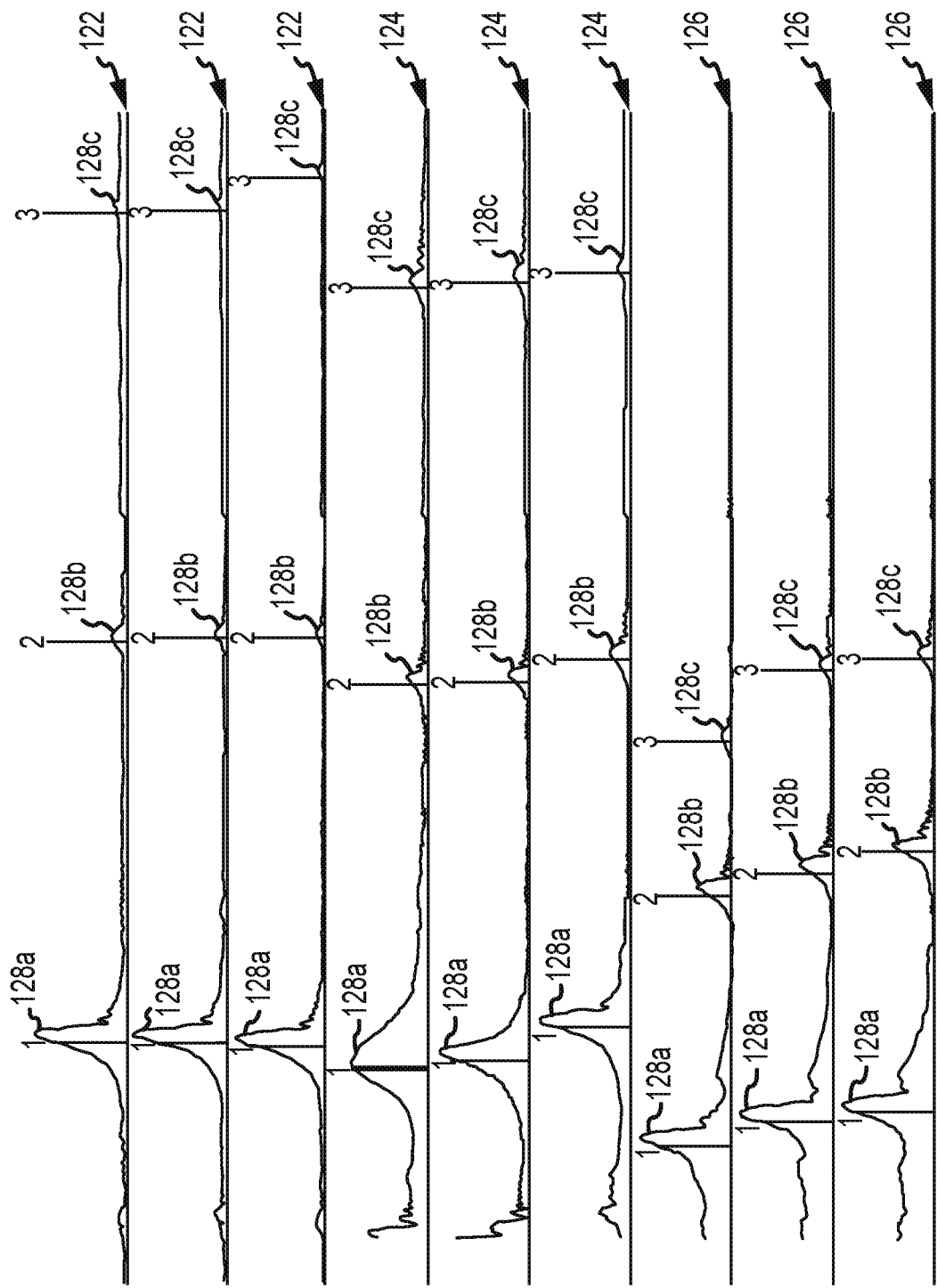
FIG. 5 presents various resonance inspection results of parts that may illustrate operation of a vibrational testing system.

The three spectra 124 shown in FIG. 5 may represent the frequency response of a part 120 to a certain input frequency, and where this in-service part 120 has been accepted by the resonance inspection tool 100. Note how the three peaks 128a, 128b, and 128c in the spectra 124 may differ slightly yet generally conform with the corresponding peaks 128a, 128b, and 128c in the spectra 122 (again, associated with a new production part 120).

The three spectra 126 shown in FIG. 5 represent the frequency response of a part 120 to a certain input frequency, and where the part 120 has been rejected by the resonance inspection tool 100. Note how the three peaks 128a, 128b, and 128c in the spectra 126 differ in at least one respect from the corresponding peaks 128a, 128b, and 128c in the spectra 122 (again, associated with a part 120 that the resonance inspection tool 100 would accept or classify as compliant). Generally, each of the peaks 128a, 128b, and 128c in the spectra 126 has shifted to the left compared to the corresponding peaks 128a, 128b, and 128c in the spectra 122 and 124. Moreover, note the "compression" between the peaks 128a, 128b in the spectra 126 compared to the spectra 122, 124, as well as the "compression" between the peaks 128b, 128c in the spectra 126 compared to the spectra 122, 124.

In this regard, evaluation or testing of a part against a sort may result in the part being classified into at least one of a compliant part classification or a non-compliant part classification based on a comparison of the vibrational data for a part 120 to vibrational data for a qualification part population. In this regard, the vibrational data regarding the qualification part population may be a statistical representation of vibrational data regarding a plurality of parts that comprise the qualification part population. The vibrational data for the qualification part population may be gathered in the same manner describe above in relation to a part 120. For instance, the qualification part population may comprise vibrational data for parts 120 that undergo subsequent evaluation to determine the parts define compliant parts (e.g., by subsequent destructive testing to validate the parts as compliant).

The vibrational data regarding the qualification part population may include or be used to generate one or more metrics (e.g., resonance metrics) as described above. In turn, the sort may include sort parameters defined relative to the vibrational data (e.g., including one or more metrics) of the qualification part population that the vibrational data of a part under test is compared to during the sort. Such sort parameters may include, for example, minimum values, maximum values, acceptable ranges of values, unacceptable ranges of values, acceptable relative values, unacceptable relative values, or any other appropriate measure or relative measure regarding the vibrational data that may be used to evaluate whether a part under test is to be classified into a compliant part classification or a non-compliant part classification. As will be described in greater detail below, a sort parameter may include a bound (e.g., an upper boundary, a lower boundary, or any other appropriate boundary) such that vibrational that falls outside the bound may result in a corresponding part being classified into a non-compliant part classification.

In this regard, the qualification part population may either correspond to a compliant part classification or a non-compliant part classification. For instance, if the qualification part population corresponds to a compliant part classification, the evaluation of the vibrational data for a part under test may include comparing the vibrational data of the part under test to the sort parameters of the qualification part population. If the vibrational data of the part under test satisfies the sort parameters of the qualification part population, the part under test may be classified into a compliant part classification. Additionally or alternatively, in such a case, if the vibrational data of the part under test fails to satisfy the sort parameters of the qualification part population, the part under test may be classified into a non-compliant part classification. Alternatively, the qualification part population may correspond to a non-compliant part classification. If the vibrational data of the part under test satisfies the sort parameters of the qualification part population, the part under test may be classified into a non-compliant part classification. Additionally or alternatively, in such a case, if the vibrational data of the part under test fails to satisfy the sort parameters of the qualification part population, the part under test may be classified into a compliant part classification.

With returned reference to FIG. 1, it may be appreciated that the part production system 2 may perform a batch part production process or a continuous part production process. In the case of a batch part production process, parts 4 may be produced in batches such that a plurality of parts 4 that are each collectively produced in a batch of the batch part production process may define a batch of parts for purposes of discussion herein. In the case of a continuous part production process, a batch of parts may be defined in relation to a given number of parts produced or a given time period. For instance, for a continuous production process, a batch of parts may be defined as a given number of a plurality of parts relative to the order in which the parts are produced. As an example, if the given number of parts is 50, a batch of parts may be defined for each successive group of 50 parts produced by the part production process. In this context, the given number of the plurality of parts that define a batch may be based on a production rate of a part production process. For instance, a part production process with a relatively high rate of production may have a relatively large number of parts belonging to each batch such that the given number of the plurality of parts in a batch may be at least about 100, at least about 250, at least about 500, or at least about 1,000. In such contexts, the given number of the plurality of parts in a batch may be not more than about 5,000, not more than about 2,500, not more than 2,000, or not more than about 1,000. For a part production process with a relatively low rate of production, a relatively small number of parts may belong to each batch. For instance, the given number of the plurality of parts in a batch may be at least about 5, at least about 10, at least about 25, or at least about 50. In such contexts, the given number of the plurality of parts in a batch may be not more than about 100, not more than about 75, not more than 50, or not more than about 25. In this regard, the given number of the plurality of parts that belong to a batch may be dependent on the production rate of the process such that for a given part production system 2 or a part production process, the size of the batch may change based on the rate of production actually realized at the time of producing the parts. In addition, the foregoing minimum and maximum examples of the given number of the plurality of parts in a batch may define global maximums, minimums, or combinations thereof may define global ranges that may be applied to any part production process, including for a given number of parts over which an analysis of vibrational data for parts occurs.

Alternatively, for a continuous production process, a batch of parts may be defined as parts produced by the process in a given period of time. As an example, if the given period of time is 1 hour, a batch of parts may be defined as comprising each part produced by the part production process during the 1 hour time period. In this context, the given time period for production of the plurality of parts that define a batch may be based on a production rate of a part production process. For instance, a part production process with a relatively high rate of production may have a relatively small time period defining the parts belonging to each batch such that the given time period defining the plurality of parts in a batch may be not more than about 10 minutes (0.167 hours), not more than about 15 minutes (0.25 hours), not more than about 30 minutes (0.5 hours), not more than about 45 minutes (0.75 hours), or not more than about 1 hour. In such contexts, the given time period defining the plurality of parts in a batch may be at least about 1 minute (0.017 hours), at least about 5 minutes (0.083 hours), at least about 10 minutes (0.167 hours), or at least about 15 minutes (0.25 hours). For a part production process with a relatively low rate of production, a relatively larger time period may define the number of parts that belong to each batch. For instance, the given time period defining the plurality of parts in a batch may be at least about 15 minutes (0.25 hours), at least about 30 minutes (0.5 hours), at least about 1 hour, or at least about 2 hours. In such contexts, the given number of the plurality of parts in a batch may be not more than about 8 hours, not more than about 5 hours, not more than 3 hours, or not more than about 1 hour. In this regard, as the given number of parts or the given time period defining the plurality of parts that belong to a batch may be dependent on the production rate of the process such that for a given part production system 2 or a part production process, the size of the batch may change based on the rate of production actually realized at the time of producing the parts. In addition, the foregoing minimum and maximum examples may define global maximums, minimums, or combinations thereof may define global ranges that may be applied to any part production process. In any regard, vibrational testing to produce vibrational data may allow for evaluation of parts 4 produced by a part production process relative to a batch of parts. Such collective evaluation of parts comprising a batch of parts may be referred to as batch evaluation and may be performed by a batch evaluation module 130 of the vibrational testing system 6. As a first example of potential batch evaluation, a batch of parts may be evaluated against a batch sort. In an embodiment, the batch sort may comprise a batch sort threshold that, in a manner analogous to the sort parameters of a sort described above, may be used for evaluation of a batch of parts. However, unlike the sort described above, the vibrational data evaluated relative to the batch threshold may comprise collective vibrational data of the plurality of parts comprising the batch. In this regard, the collective vibrational data may comprise a statistical representation of the vibrational data for the individual ones of the plurality of parts within the batch. For instance, the collective vibrational data may comprise a mean, median, standard deviation, range, or other statistical representation of any of the vibrational data of individual ones of the plurality of parts in the batch including metrics included in or generated from the vibrational data, including for a given time period over which an analysis of vibrational data for parts occurs.

While the collective vibrational data of a batch may be based on vibrational data of the individual ones of the plurality of parts comprising the batch, the vibrational data of the individual one of the plurality of parts comprising the batch may be treated differently when generating the collective vibrational data. For instance, evaluation of the batch of parts may be skewed or otherwise effected by considering outliers among the individual parts in the batch. As such, the generation of the collective vibrational data may include discounting vibrational data for certain ones of the plurality of parts in the batch. Such discounting may decrease the effect of vibrational data of an individual part relative to the vibrational data of other parts of the batch of parts. It may be appreciated that vibrational data for at least one of the individual parts may be, but is not required to be, entirely discounted so as not to effect or inform the collective vibrational data of the batch of parts. For instance, vibrational data of the individual parts may be discounted in the event that the vibrational data for the individual part falls outside a standard deviation of the collective vibrational data, corresponds to a part in a non-compliant classification, or meets any other appropriate condition.

The evaluation of a batch of parts against a batch sort may result in any one or more of a number of different results relative to the batch of parts. For instance, the batch sort may be used to classify the entirety of the batch of parts into one of a compliant classification or a non-compliant classification (e.g., based on whether the collective vibrational data satisfies the batch threshold). Alternatively, in the instance where a batch of parts fails to meet the batch threshold of the batch sort, the plurality of parts in the batch of parts may undergo additional testing (e.g., to further evaluate the parts for determination of classification of the parts or for evaluation of a process used to produce the batch of parts). For instance, if the batch of parts fails to meet the batch threshold, each one of the individual ones of the batch of parts may be further tested.

Figure 6:
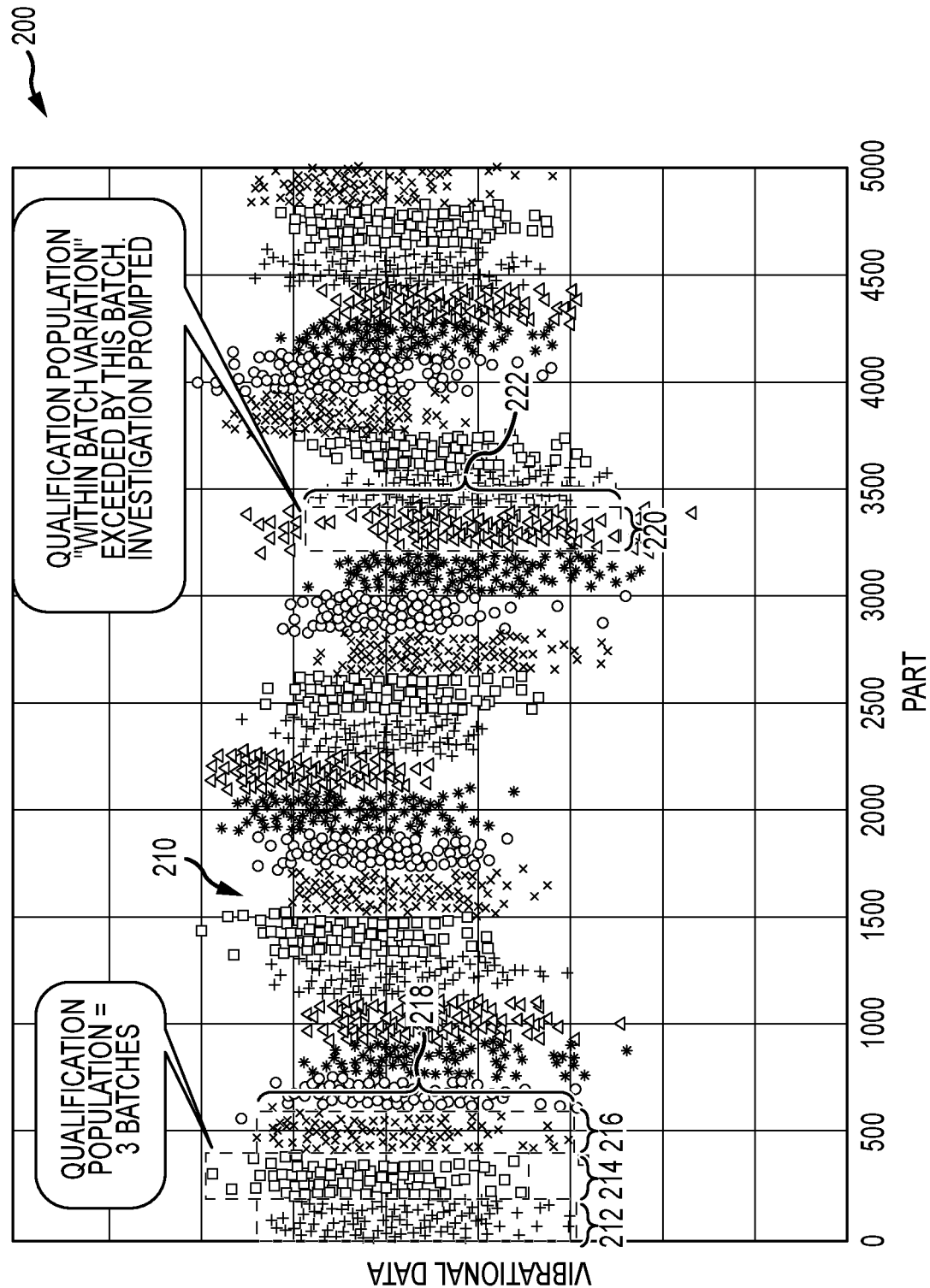
FIG. 6 is a plot of vibrational data for a plurality of parts arranged into batches that may be used for batch evaluation of parts.

With further reference to FIG. 6, a plot 200 of vibrational data 210 from a plurality of parts is shown. In the plot 200, vibrational data 210 for each of the plurality of parts is plotted as a point. That is, each point represents the vibrational data (e.g., potentially including a value for a vibrational metric) for a given part. The parts are grouped by batch such that different adjacent batches in the plot 200 are represented by a different plot point style (e.g., dot, cross, star, etc.). As may be appreciated in the plot 200, batch 212, batch 214, and batch 216 are highlighted. These batches may comprise a population of qualification parts. Such qualification parts and the resulting batches corresponding thereto may provide for qualification data to establish the batch threshold. For instance, one example of a batch threshold may relate to the total variation 218 of the collective vibrational data 210 for a given batch. In turn, each batch of parts may be evaluated relative to the batch threshold for determining whether each given batch satisfies the batch threshold for a given batch sort. In the example provided in FIG. 6, batch 220 may have a total variation 222 that exceeds the total variation 218 corresponding to the batch threshold. In this regard, batch 220 may be determined not to satisfy the batch threshold and may be identified as failing the batch sort. In turn, as described above, batch 220 may be flagged for further testing, the plurality of parts comprising batch 220 may be assigned to a non-compliant part classification, or some other appropriate action may be taken relative to the batch 220. In the case where the plurality of parts comprising the batch 220 are classified to a non-compliant part classification, it may be appreciated that this may include reclassification of parts that may have been previously categorized into a compliant part classification based on a part sort relative to the individual vibrational data for the individual parts. In this regard, a part sort and a batch sort may be independently performed such that even parts that satisfy a part sort may be reclassified or subjected to further testing as a result of belonging to a batch 220 that fails to satisfy a batch threshold for a batch sort.

While the total variation 218 of the collective vibrational data 210 for a given batch is describes as corresponding to the batch threshold, it may be appreciated that other batch thresholds may be defined for application in relation to a batch sort. This may include a change in the collective vibrational data between a plurality of batches. For instance, if the change in the collective vibrational data between a first and a second batch exceeds some predefined value, the second batch may be determined to not satisfy the batch threshold for a batch sort. In other words, the batch threshold may comprise a maximum change in collective vibrational data between a plurality of batches (e.g., including either adjacent batches or some number of batches over time) so that if the change in the vibrational data between the plurality of batches exceeds the maximum change, the batch that exceeds the maximum change may not satisfy the batch threshold for the batch sort. As used herein, the change in the collective vibrational data may comprise a change in a statistical representation of the collective vibrational data such as a vibrational data mean, a standard deviation, a median, or any other appropriate representation. As will be described in greater detail below, the batch sort may include identification of a trend in the collective vibrational data, such that a trend that exceeds a limit may not satisfy the batch threshold and thus, fail the batch sort.

With returned reference to FIG. 1, the vibrational testing system 6 may provide feedback to the part production system 2. In this regard, it may be appreciated that a part production process may include process variables that effect parts 4 produced by the part production process. Specifically, it has been found that the effects of such process variables on parts 4 produced by the part production process may manifest in the vibrational data regarding a part 4 produced by the part production process. A change in a process variable may produce a repeatable, observable result in the vibrational data regarding a part 4. Accordingly and as will be described in greater detail below, a correlation between the result in the vibrational data and a process variable may be determined.

Specifically, a response characteristic may be identified that correlates to the process variable of the part production process. The response characteristic may provide information regarding a state of the process variable. In turn, a control for the process variable may be adjusted based on the identified state of the process variable from the response characteristic. By way of example, one such process variable may be a temperature at which a process step occurs in the part production process. The temperature (i.e., the process variable) may be correlated to a given response characteristics in the vibrational data of parts 4 produced using the part production process. Specifically, the response characteristic may provide information regarding a state of the process variable such as, in this example, whether the temperature is too high or too low and/or a magnitude of a deviation of the process variable. In turn, a control (e.g., a thermostat, other device, or other condition that effects the temperature of the part production process) may be adjusted in view of the response characteristics that is identified from the vibrational data of parts 4 that are tested. The vibrational testing system 6 may include a control module 148 that may determine an adjustment to a control of the part production system and/or directs interface with the part production system 2 to adjust the control.

Accordingly, the response characteristic, when identified from the vibrational data, may indicate that a process variable for a part production process is out of control or requires modification. In turn, a control for the process variable may be adjusted based on the identification of the response characteristic. Specifically, the response characteristic may provide information on the state of the process variable. This information regarding the state of the process variable may include information regarding a direction and/or magnitude of adjustment needed for the control of the process variable. For instance, continuing the example from above, the response characteristic may indicate whether a control that effects the temperature at which a process step occurs may indicate whether the temperature needs to be raised or lowered and/or the magnitude (e.g., in degrees) such a change should involve.

The response characteristic identified from the vibrational data may be any data or combination of data that is correlated to the process variable. For instance, the vibrational data may comprise resonance response data and the response characteristic may comprise a resonance metric. That is, the response characteristic may comprise any value, relative values, statistical information, mathematical operation result, or any other appropriate manipulation of the vibrational data. Moreover, it may be appreciated that a plurality of response characteristics may be correlated to corresponding different process variables. In this regard, a plurality of response characteristics may be monitored such that any given one or more response characteristics that indicate an adjustment is needed for a control of a process variable may be identified from the vibrational data.

Moreover, the process variable that is correlated to the response characteristic may comprise any appropriate process variable for a part production process. Examples of such process variables may include a manufacturing variable that relates to the machinery or equipment used to produce the part and/or any processing related thereto. For example, a manufacturing variable may comprise, but is not limited to, a process temperature, a process rate, manufacturing component wear (e.g., die wear or the like), raw material properties, or any other variable related to the manufacture of the part. Further still, the process variable may comprise a component variable. The component variable may relate to the resulting part or any part intermediary that affects the final part. For example, the component variable may comprise, but is not limited to, a part dimension, a stress state, a crystallographic orientation, a material property, phase ratios, part chemistry, part microstructure, or any other variable related to the component. It may be appreciated that a component variable may result from any one or more different manufacturing variables. In this regard, in the case where the process variable comprises a component variable that is correlated to the response characteristic, identification of the response characteristic may allow for determination of a single adjustment or a plurality of adjustments to be made to appropriate controls for the process variable. That is, identification of a response characteristic in the vibrational data regarding a process variable may result in a plurality of controls of the part production process being implicated in an adjustment.

A response characteristic may be identified in relation to vibrational results for a single part or may be identified based on a change in vibrational data between a plurality of parts. In the case of identification of a response characteristic in a single part, it may be that the response characteristic must be observed in each individual part over some number of parts. For instance, if a single part is produced that includes a response characteristic that indicates a process variable is in a state that needs correcting, the process may not be modified. However, if the response characteristic indicating the process variable is in a state that needs correcting occurs in a given number of parts or over a given time period, the control for the process variable may be adjusted. The adjustment may be according to a given response characteristic (e.g., the last part that had a response characteristic indicating the change is needed) or may be according to some representation of all parts with the response characteristic indicating the change is needed.

Figure 7:
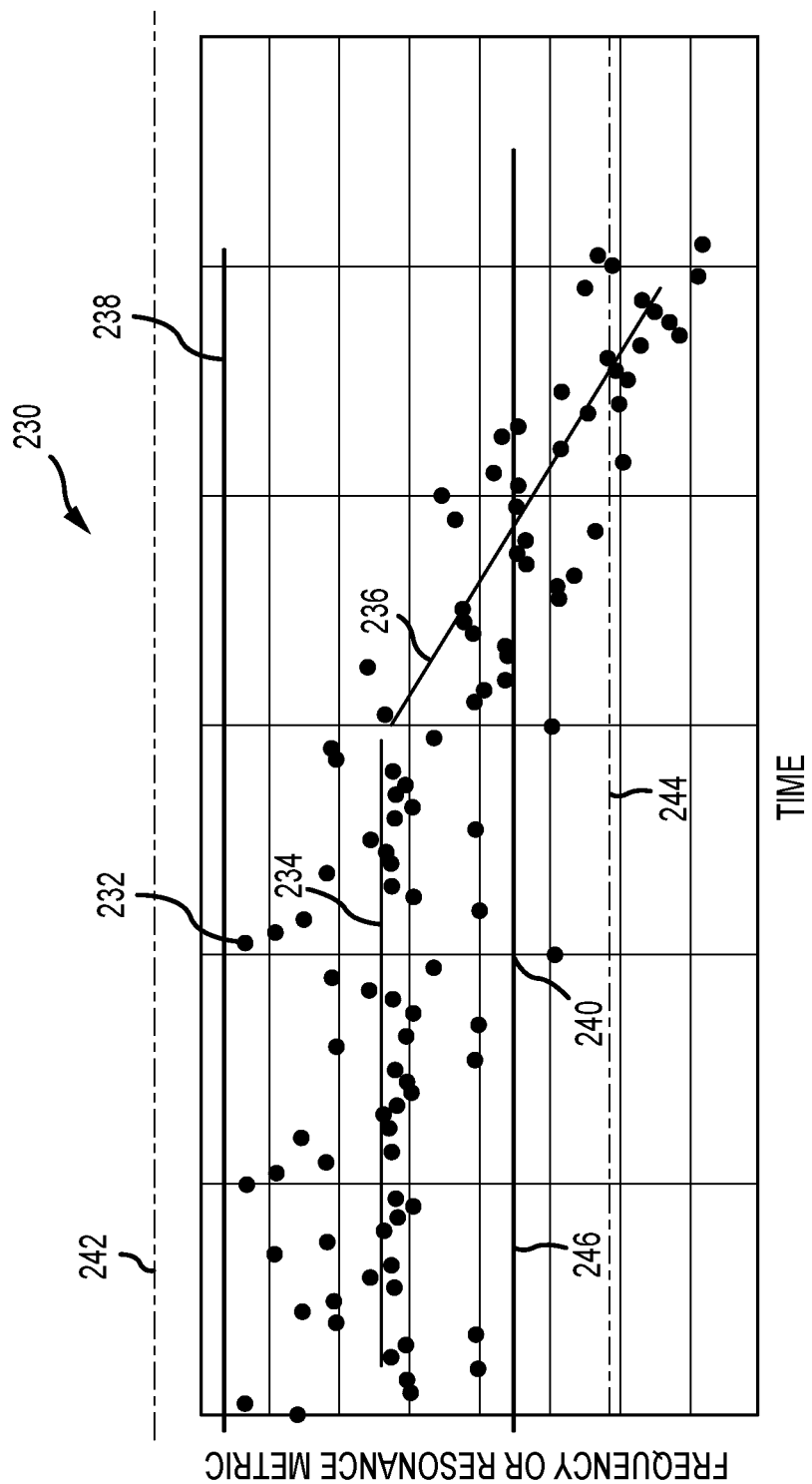
FIG. 7 is a plot of vibrational data for a plurality of parts that may be used to identify a trend in the vibrational data.

The definitions of a given number of parts and a given time period provided above in relation to batch size are equally applicable in this context of a given number of parts or a given time period. The response characteristic may be identified in response to a change in the vibrational data between a plurality of parts. In this regard, the change in the vibrational data between the plurality of parts may include a trend in the vibrational data. Such a trend may comprise a response characteristic indicating a change in the corresponding process variable to the response characteristic is needed. To illustrate identification of a response characteristic relative to a change in the vibrational data between a plurality of parts, FIG. 7 depicts a plot 230 of vibrational data 232 for a plurality of parts. The vibrational data 232 comprises plot points representative of the vibrational data 232 for each one of a plurality of parts with the vertical axis representing the value of the vibrational data and the horizontal axis representing time.

In FIG. 7, each data point of vibrational data 232 may contribute to a statistical representation of the vibrational data. For instance, a moving average 234 may be represented as a line relative to the vibrational data 232. The moving average 234 may be updated with each new data point of vibrational data 232. While a moving average 234 is discussed, it may be appreciated that other statistical representations may be utilized in lieu of a moving average and the discussion of a moving average is for illustrative purposed only. In any regard, the moving average 234 may correspond to an average vibrational data value generated using a given number of previous data points of vibrational data 232 corresponding to parts. The moving average 234 may include weighting more recent parts relative to older parts.

In any regard, the moving average 234 may be monitored relative to a number of values. For instance, an upper limit 238 and/or a lower limit 246 are represented in the plot 230. If the moving average 234 crosses one of the upper limit 238 or lower limit 246, a response characteristic may be identified that indicates a state of a process variable requires adjustment. In this regard, the moving average 234 may allow for identification of a trend 236 in the vibrational data 232 as represented by the portion of the moving average 234 that begins to deviate to a relatively steady state portion of the moving average to the left side of the plot 230. It may be appreciated that the trend 236 may be identified relative to limit 238 or limit 246 as described above or alternative measures of a trend. For example, continued movement of the moving average 234 in a single direction (e.g., either continued lower values or continued higher values of the vibrational data) over a given number of parts or for a given time period may also be used to identify a trend 236. For instance, the evaluation of vibrational data 232 may generally be over the course of a batch of parts. In this regard, any of the foregoing possible definitions of a batch of parts may be used to determine the number of parts and/or time period over which parts are evaluated to determine a trend.

In any regard, it may be appreciated that an upper sort boundary 242 and a lower sort boundary 244 may also be represented in the plot 230. The upper sort boundary 242 and the lower sort boundary 244 may represent vibrational data values that, if a vibrational data value fails to fall between, results in the part being categorized in a non-compliant part classification. That is, if the vibrational data 232 for a part falls outside a region bounded by the upper sort boundary 242 or the lower sort boundary 244, the part may be non-compliant and may be classified as such. In turn, identification of the trend 236 may occur prior to the moving average 234 falling outside the bounded area defined by the upper sort boundary 242 or the lower sort boundary 244. For instance, the upper limit 238 and the lower limit 246 may be defined relative to the upper sort boundary 242 and the lower sort boundary 244 such that if the moving average 234 crosses the upper limit 238 or lower limit 244, a response characteristic may be identified to allow for adjustment of a control for a process variable. This adjustment may occur prior to the moving average 234 crossing the upper sort boundary 242 or the lower sort boundary 244. In turn, the adjustment to the control for the process variable in response to the response characteristic being identified prior to the moving average 234 crossing the upper sort boundary 242 or the lower sort boundary 244 may reduce the likelihood that parts of a non-compliant part classification (e.g., a statistically significant number of parts) are produced by the part production process. In some instances, the adjustment of the control may prevent any (or a significant number of) parts of a non-compliant part classification being produced.

As shown in FIG. 1, the correlation analysis module 8 may be in operative communication with the vibrational testing system 6 and the part production system 2. The correlation analysis module 8 may comprise a memory that stores one or more correlations between a response characteristic and a process variable. In this regard, the vibrational testing system 6 may access the correlation analysis module 8 to retrieve the correlations when identifying a response characteristic from the vibrational data and determining a state of a process variable correlated to the response characteristic.

In some embodiments, a plurality of metrics in the vibrational data may be monitored for identification of a response characteristic in one or more of the metrics. For instance, more than one response characteristic may be identified from the vibrational data that indicates that more than one process variable is to be adjusted. For instance, separate, potentially unrelated, process variables may be correlated to different response characteristics that may each be uniquely identified when analyzing the vibrational data. These different response characteristics may relate to different portions or metrics of the vibrational data. Also, it may be that certain response characteristics may be identified from a batch analysis regarding collective vibrational data of a plurality of parts, while other response characteristics may be identified from vibrational data of individual ones of the parts. In this regard, a batch characteristic may be identified that is correlated to a first process variable based on an analysis of the collective vibrational data for a batch of parts comprising a plurality of parts. Further still, a part response characteristic may be identified from the vibrational data of the individual ones of the parts that is correlated to a second process variable that may be different than the first process variable correlated to the batch characteristic identified from the collective vibrational data.

In addition, the correlation analysis module 8 may operate to identify a correlation between a response characteristic and a process variable. Specifically, the correlation analysis module 8 may receive vibrational data regarding parts 4 from the vibrational testing system 6 and may get values for a process variable used to produce each corresponding part 4 for which vibrational data is received. The process variable for a plurality of parts may differ for different ones of the parts 4. In this regard, the correlation analysis module 8 may be operative to identify a response characteristic based on an analysis of the vibrational data of a plurality of parts 4 for which differing process variable values are known.

The correlation between a response characteristic and a process variable may be determined based on an analysis of a multidimensional data set. The multidimensional data set may comprise a plurality of dimensions corresponding to one or more metrics from the vibrational data (e.g., vibrational dimensions). The multidimensional data set may also include a dimension corresponding to the process variable that varies over the plurality of parts 4 for which vibrational data has been obtained (e.g., a non-vibrational dimension). In turn, the multidimensional data set may be analyzed to determine which of the vibrational dimensions relate to the non-vibrational dimension to determine a correlation therebetween. That is, the metric corresponding to the vibrational dimension that correlates with the non-vibrational dimension may be identified as correlating to the process variable that comprises data of the non-vibrational dimension.

In order to determine which of the vibrational dimensions correlates to the non-vibrational dimension, at least one of a classification analysis or a regression analysis may be performed. For instance, the classification analysis may include a classification in which the non-vibrational dimension is classified in relation to the vibrational dimensions to determine which of the vibrational dimension is most representative of the non-vibrational dimension. In this regard, classification of the non-vibrational dimension values into a given vibrational dimension may be indicative that the vibrational dimension is correlated to the non-vibrational dimension such that the response characteristic corresponding to the vibrational dimension may be correlated to the process variable. In a similar regard, a regression analysis may be used to determine which of the vibrational dimensions most closely correlates with the non-vibration dimension by determining which of the vibrational dimensions most closely fits the non-vibrational dimensions. Examples of potential evaluations may include a non-linear least squares regression, a correlation coefficient analysis, an analysis of variables (ANOVA) approach, a k-means clustering approach, a principle components analysis, or a random forest analysis. In any regard, once a correlation has been identified, the correlation may be stored for access by the vibrational testing system 6 when attempting to identify a response characteristic and in turn determining what process variable is correlated thereto. A plurality of such correlations may be provided such that a plurality of metrics may be monitored to determine a plurality of correlated process variables in the analysis. It may also be appreciated that the correlation analysis by the correlation analysis module 8 may provide a measure of the direction and/or magnitude of a process variable response based on the vibrational data.

A part production process may be modified from a default part production process to a test part production process. The test part production process may include control of one or more process variables to deviate the one or more process variables from a default value. The test production part process may facilitate a number of important aspects related to the disclosure presented herein. For instance, a test part production process may be used in connection with determining a correlation between a response characteristic and a process variable. In connection with the process for determining a correlation between vibrational data and a process variable, it may be appreciated that varying values of the process variable of interest may assist in the determination of a correlation to the vibrational data being analyzed.

As described above, the correlation analysis module 8 may be in operative communication with the part production system 2 to obtain a value for a process variable used to produce a part having vibrational data that is analyzed. In this regard, the test production part process may allow for changing a process variable in a controlled manner to produce test parts. As the correlation analysis module 8 may be in operative communication with the part production system 2, the process variable for each test part produced by the test part production process may be communicated to the correlation analysis module 8. As the process variable is controllably varied in the test part production process, a plurality of test parts that each have a unique process variable associated therewith may be tested to obtain vibrational data. As described above, the process variable may correspond to a non-vibrational dimension in a multi-dimension data set that is analyzed to determine a correlation between the response characteristic and the process variable. By employing the test part production process to intentionally vary the one or more process variables in a manner that provides varying values for the process variable to allow for determination of a correlation in the vibrational data over test parts produced by the test part production process.

Figure 8:
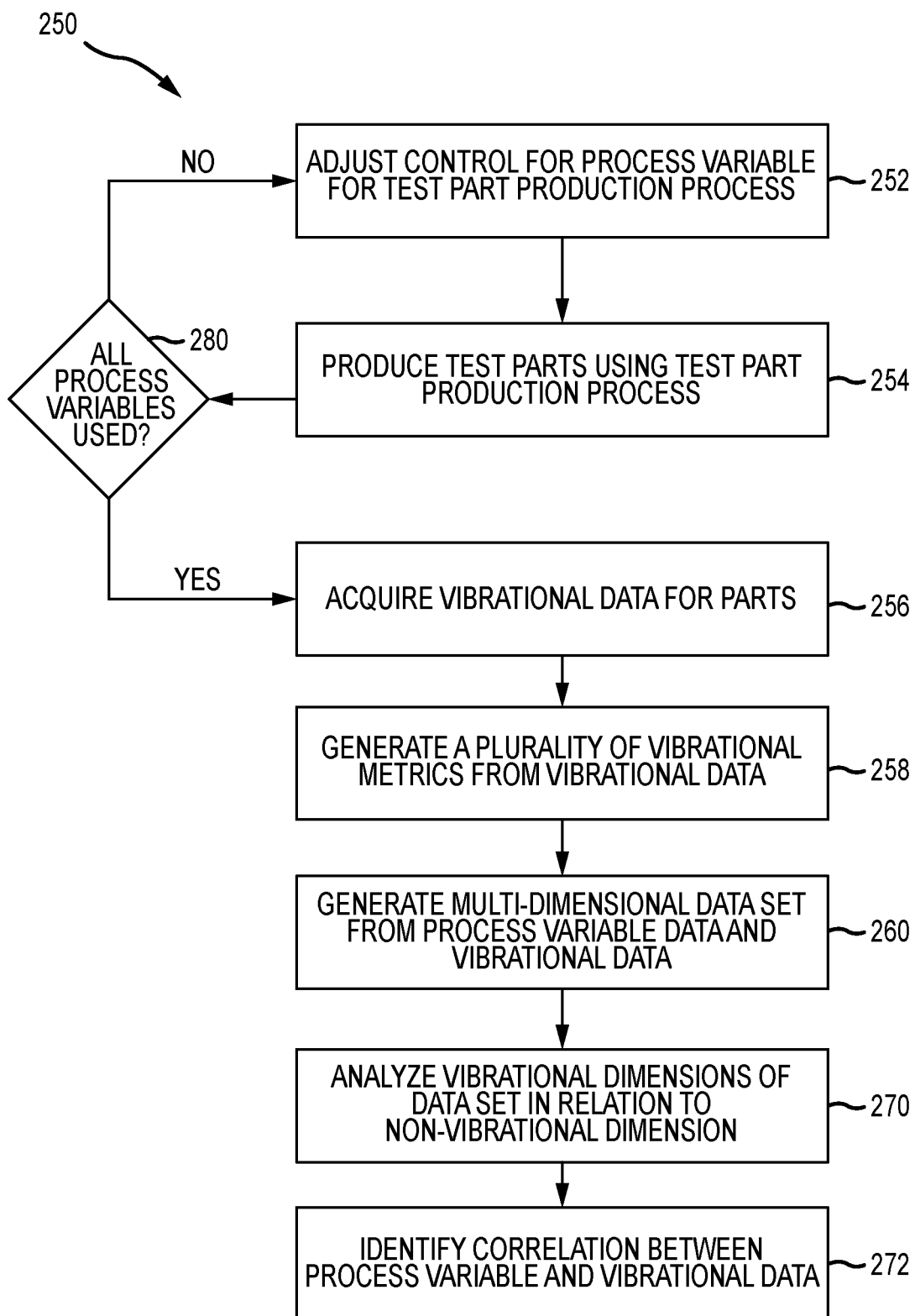
FIG. 8 is flowchart depicting an embodiment of a method related to determining a correlation between a process variable and a vibrational metric.

An embodiment to a method 250 related to such a test part production process is shown in FIG. 8. The method 250 may include adjusting 252 a control for a process variable from default part production process. The adjusting 252 of the control may result in an altered part production process, thus resulting in the test part production process. The method 250 may also include producing 254 test parts using the test part production process. After producing 254 test parts, it may be determined at 280 whether all process variables for which test parts are desired have been used. If not all process variables have been used, the method 250 may iterate to further facilitate adjusting 252 the part production process for the next process variable desired. If it is determined at 280 that all process variables have been used to product test parts, the method may progress and include acquiring 256 vibrational data for the test parts produced. In this regard, the method 250 may allow for a plurality of values for a process variable to be used in various test part production processes so that test parts produced using different process variables may be produced. This may be beneficial in determining a correlation between a process variable and a response characteristic by providing a range of process variables to allow for discernment of the resulting vibrational response resulting from the different process variables.

The method 250 may include generating 258 a plurality of vibrational metrics from the vibrational data for the test parts. As described above, the vibrational metric may include any absolute value, relative value, mathematical operation, statistical representation, or other appropriate manipulation of the vibrational data to produce the metric. In turn, the method 250 may also include generating 260 a multidimensional data set. The multidimensional data set may include vibrational dimensions corresponding to the vibrational data and/or the vibrational metrics generated at 258. The multidimensional data set further includes a non-vibrational dimension corresponding to the different process variable used to produce the test parts, wherein the values of the non-vibrational dimension is provided in relation to the vibrational data for corresponding test parts produced using a given value of the process variable.

In turn, the method 250 may include analyzing 270 the vibrational dimensions relative to the non-vibrational dimensions. As described above, this may include approaches that include regression analysis or clustering to identify relationships or correlations between the vibrational data and the process variable values. One particular approach may include use of Mahalanobis Taguchi System (MTS) math on various combinations of vibrational metrics and process variable values. MTS math is a central-tendency kind of analysis that calculates the 'distance' of a value in a first dimension from the center of a reference population resulting in a value called the Mahalanobis Distance (MD). The MD is low when the value in the first dimension is near to the center of the reference population (e.g., is highly correlated or similar), and high when the part is 'not like' the reference population (e.g., is not correlated or dissimilar). A bias value may also be calculated that is the ratio of the distance from the center of a first reference population to the center of a second reference population. The bias value is high when the part is much farther from the first reference population than from the second reference population, providing quantifiable analysis of the relative correlation or similarity between the respective reference populations. As such, a genetic algorithm may be used to adjust which combinations of vibrational metrics are used, based on maximizing a score corresponding to the "correctness of sorting" or correlation value. For example, if the vibrational data and process variables using hypothetical vibrational metrics numbered 1, 2, and 3 generate a score of 0.995, and the same score for vibrational metrics numbered 8, 9, 10 is 0.85, vibrational metrics 1, 2, and 3 will be used more in future combinations, until some convergence on the score or correlation value is reached. Vibrational metrics 8, 9, 10 will be used less frequently in combinations, because their score tended to be lower.

In turn, the analyzing 270 may include maximizing the correlation of the MD for a given vibrational dimension in a plurality of vibrational dimensions to the non-frequency dimension associated with a varying process variable. As described above, the process variable corresponding to the non-vibrational dimension may include, but is not limited to, a part dimension, the part mass, or a 'real number' type of value associated with the part (maximum temperature exposure, crystallographic orientation, creep percentage, or other value). When this analyzing 270 is performed, the genetic algorithm described above may be used in a similar manner, to maximize the correlation of MD between the vibrational metrics and the process variable.

In addition, a clustering analysis (e.g., k-means clustering) may also be used for a finite number of process variables, such as those attached to discrete process variables such as "dies" or "cavities" used to produce parts. The analyzing 270 may include optimizing k-means clustering on vibrational metrics to calculate the center of each die/cavity cluster of vibrational data. In addition, a genetic algorithm may be used to highlight patterns that maximize the distance between each cluster, or minimize the overlap of clusters, such that the results were as 'separate' of clusters as could be obtained. The vibrational metrics that gave the most separate clusters would be 'best correlated' to that process variable. Regardless of the analysis utilized, the method 250 may also include identifying 272 a correlation between a vibrational dimension and the non-vibrational dimension (e.g., by determining the highest or maximized correlation value or most separated clusters).

Figure 9:
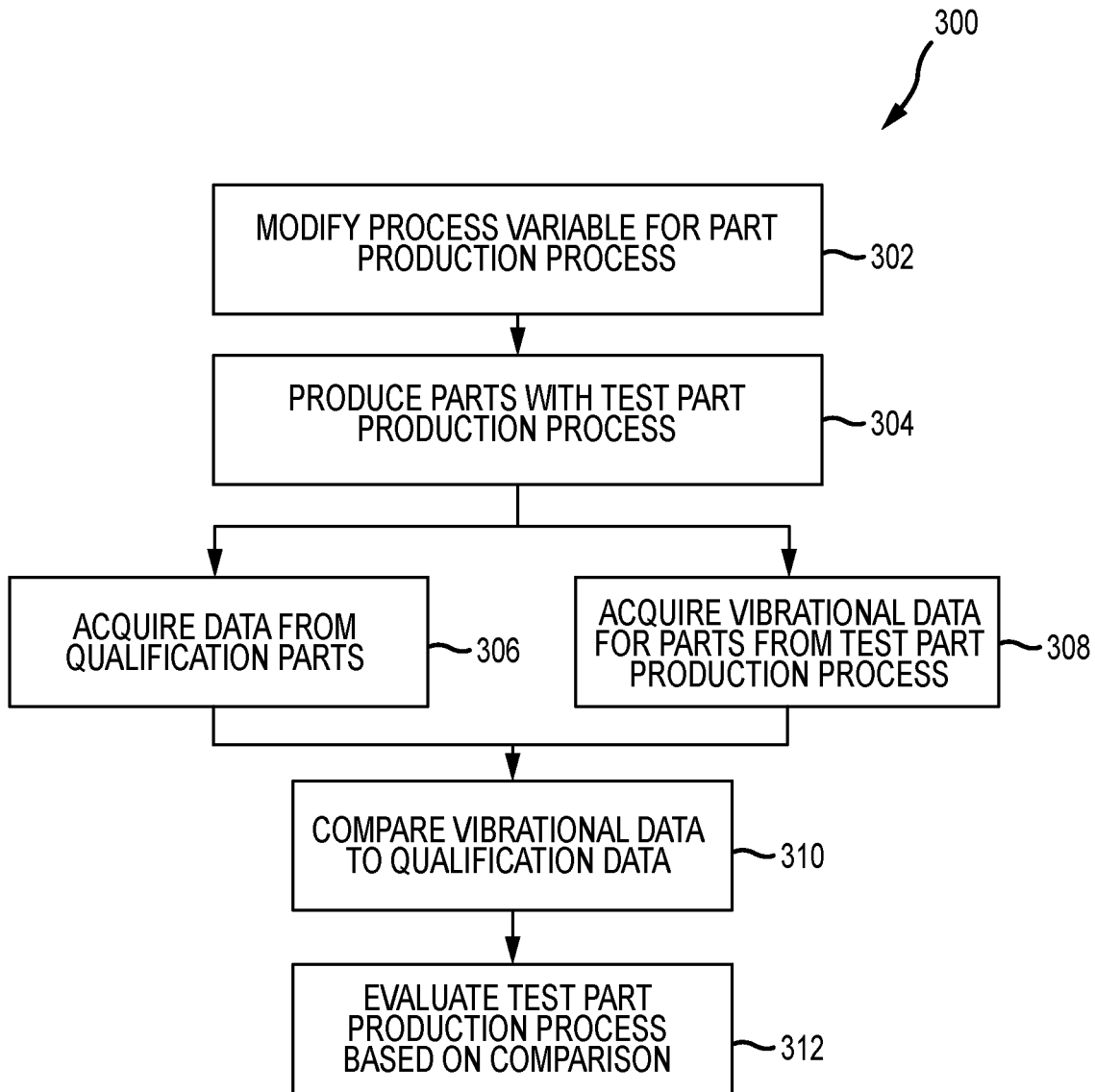
FIG. 9 is a flowchart depicting an embodiment of a method for evaluation of a test part production process in relation to a correlated response characteristic in resulting test parts produced by the test part production process.

Additionally or alternatively, a test part production process may be used to evaluate an intentional change in a process variable of a default part production process. A method 300 is depicted in FIG. 9 that may be used for such evaluation of an intentional process change. For instance, the method 300 may include modifying 302 the default part production process such that one or more process variables is intentionally modified from a default value associate with the default part production process to define a test part production process with the modified process variable. In turn, test parts may be produced 304 using the test part production process having the altered one or more process variable. The test parts may undergo vibrational testing to acquire 308 vibrational data for the test parts. In addition, the method 300 may include acquiring 306 data from qualification parts. The qualification part data and the vibrational data for the test parts may be compared 310. By way of example, the comparing 310 may include testing the test parts against a sort (e.g., a part sort or a batch sort) to categorize the parts into one of a compliant part classification or a non-compliant part classification. In turn, the test part production process may be evaluated 312 in relation to the comparing 310. Specifically, the evaluating 312 of the test parts may include analysis of a response characteristic corresponding to the intentionally modified process variable to determine if the corresponding frequency response of the response characteristic results in classification of parts into a non-compliant part classification or to determine the results of a sort specific to the response characteristic. Again, this may include testing individual ones of the test parts or a batch analysis on the test parts.

Figure 10:
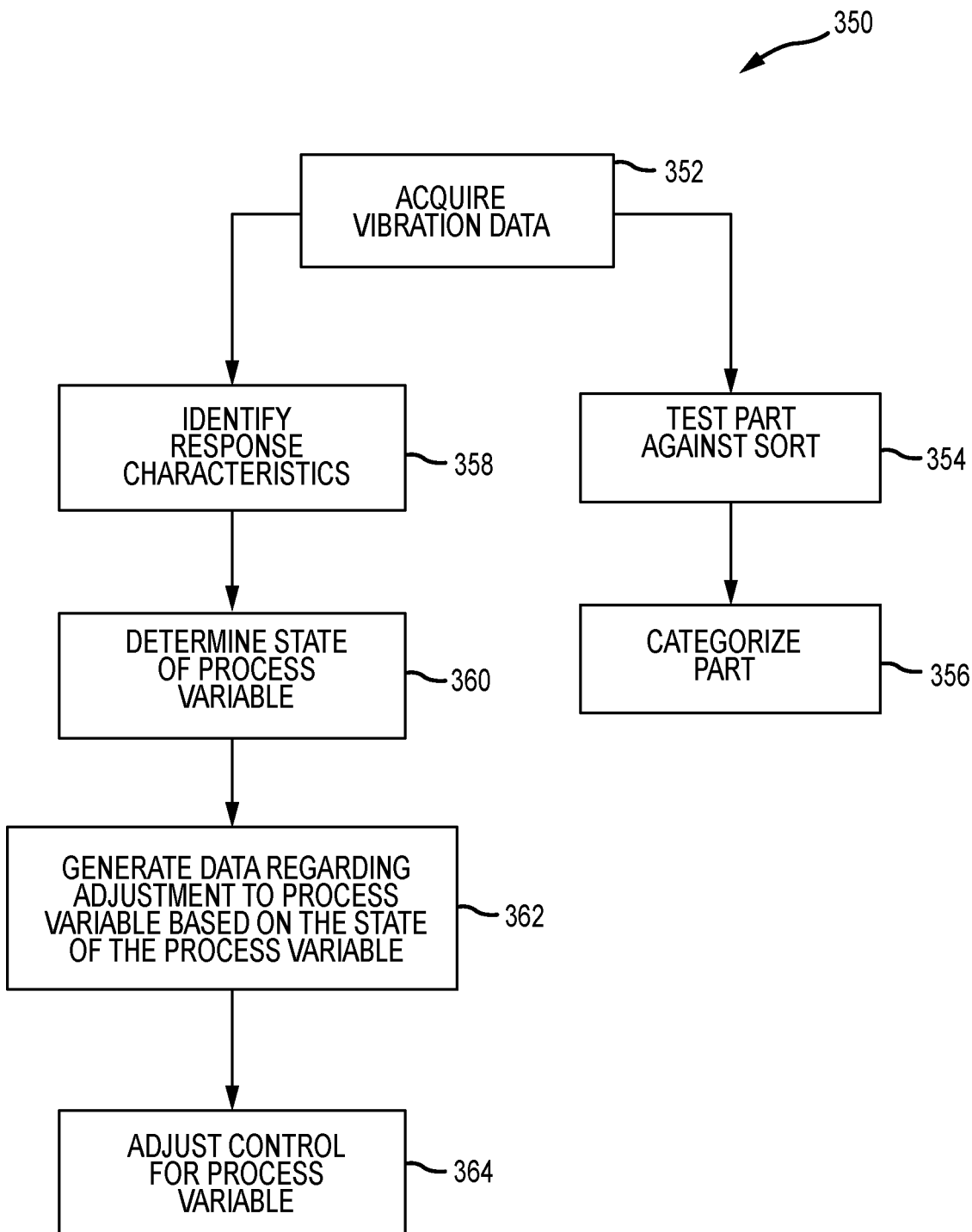
FIGS. 10 and 11 are flowcharts depicting embodiments of methods for evaluation and process control feedback generation.

With further reference to FIG. 10, an embodiment of a method 350 is depicted that includes aspects of the disclosure presented above. While in FIG. 10, both process feedback generation and part evaluation are performed in relation to vibrational data, it may be appreciated that both aspects need not be performed in conjunction in all embodiments. In any regard, the method 350 includes acquiring 352 vibrational data regarding at least one part. As described above, the acquiring 352 may include accessing a data store of previously obtained vibrational data for a part or may include physically acquiring vibrational data through active vibrational testing of the part.

The method 350 may include part evaluation by testing 354 the part against a sort. In response, the part may be categorized 356 into one of a non-compliant part classification or a compliant part classification. Such part evaluation comprising testing 354 and categorizing 356 may be performed independently of any process control feedback.

However, the method 350 may also include identifying 358 a response characteristic from the vibrational data. As described in detail above, the response characteristic may correspond to a vibrational metric from the vibrational data and may be correlated to a process variable of a part production process used to produce the part being tested. In turn, the method 350 may include determining 360 a state of the process variable correlated to the identified 358 response characteristic. As described above, once the response characteristic is identified 358, a feature or attribute of the response characteristic may inform the state of the process variable (e.g. providing an indication of a direction and magnitude by which the process variable should be adjusted to achieve an optimum or predefined value for the process variable). In this regard, the determining 360 may include determining an offset or differential between the state of the process variable as determined 360 from the identified response characteristic to an optimum or predefined value for the process variable. Such analysis may be used to generate 362 data regarding an adjustment to the process variable that is determined based on the state of the process variable determined at 360. Further still, the method 350 may include actually adjusting 364 the process variable using the data regarding the adjustment.

Figure 11:
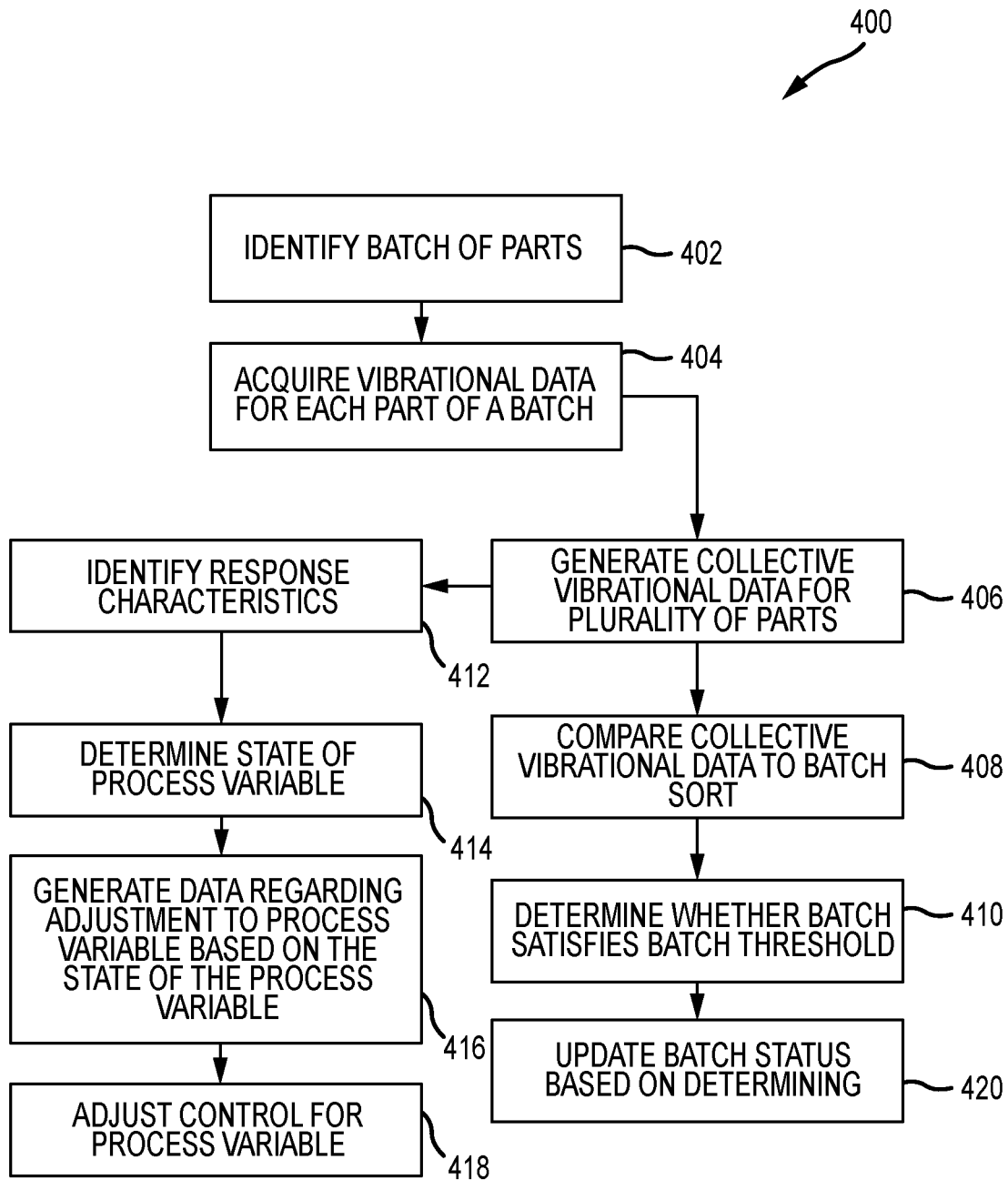

FIG. 11 presents another embodiment of a method 400 that may utilize a batch approach to part evaluation and process control feedback. As stated in relation to FIG. 10, while shown used in combination in FIG. 11, such aspects of the present disclosure need not be used in conjunction and could be performed independently. In any regard, the method 400 may include identifying 402 a batch of parts. As described above, the identifying 402 may include identifying a batch of parts produced in a true batch process, or collecting a given number of parts produced or collecting parts produced over a given time period. The method 400 further includes acquiring 404 vibrational data for each of the parts of the batch.

The method 400 may also include generating 406 collective vibrational data for the plurality or parts. As described above, this may include a statistical representation of the vibrational data for the individual ones of the parts in a batch and/or may include discounted values for the vibrational data for certain ones of the individual parts (e.g., based on an evaluation of individual parts as described in relation to FIG. 10). The method 408 may further include comparing 408 the collective vibrational data to a batch sort. The batch sort may include a batch threshold such that the comparing 408 may include determining whether the collective vibrational data for a given batch satisfies the batch threshold. The batch threshold may be evaluated in relation to a single given batch of parts or may include parameters related to the change in collective vibrational data between given batches. In any regard, the method 400 may include determining 410 whether the batch satisfies the batch threshold. The method 400 may also include updating 420 the batch status based on the determining (e.g., to classify the part in the batch into a non-compliant classification as a result of the batch threshold not being satisfied or classifying the parts for further evaluation).

The method 400 may also include generation and/or use of process feedback based on the collective vibrational data. In this regard, the method 400 may include identifying 412 a response characteristic from the collective vibrational data. The response characteristic may be identified from the collective vibrational data from a single given batch or may be identified from a change in collective vibrational data between given batches of parts. In any regard, the response characteristic may allow for determining 414 the state of a process variable in the manner described above in relation to FIG. 10. Moreover, the response characteristic identified from the collective vibrational data for the batch of parts may be different than that of the individual parts and may be correlated to a different process variable. In any regard, the method 400 may include generating 416 data regarding an adjustment to a control of the part production process based on the state of the variable determined at 414. Furthermore, the method 400, in at least one embodiment, may include adjusting 418 the control of the process variable.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for generating a feedback adjustment for control of a part production process, comprising:
   acquiring vibrational data for at least a first part produced by the part production process, wherein the vibrational data includes a frequency response of the first part when excited at a plurality of input frequencies;
   identifying a response characteristic of the first part from the vibrational data for the first part, wherein the response characteristic is correlated to a process variable of the part production process that produced the first part;
   determining a state of the process variable of the part production process that produced the first part based on the response characteristic of the first part that is correlated to the process variable; and
   generating a feedback adjustment for a control of the process variable of the part production process in response to the state of the process variable.

2. The method according to claim 1, wherein the vibrational data comprises resonance response data and the response characteristic corresponds to a resonance metric based on the resonance response data.

3. The method according to claim 1, wherein the acquiring comprises acquiring vibrational data for a plurality of parts produced by the part production process, and the response characteristic is at least based on a change in the vibrational data between different ones of the plurality of parts.

4. The method according to claim 3, wherein the change in the vibrational data between different ones of the plurality of parts comprises a trend in the response characteristic measured over a given number of the plurality of parts relative to the order in which the parts were produced.

5. The method according to claim 3, wherein the change in the vibrational data between different respective ones of the plurality of parts comprises a trend in the response characteristic measured over a given time period in which the plurality of parts are produced.

6. The method according to claim 1, further comprising:
   testing the frequency response against a sort, wherein the sort is based upon vibrational data from a qualification population.

7. The method according to claim 6, wherein the sort comprises at least one limit relative to the frequency response defining at least one of a compliant part classification sort result or a non-compliant part classification sort result.

8. The method according to claim 7, wherein the generating the adjustment for the control occurs prior to a change in the vibrational data between ones of the plurality of parts resulting in a non-compliant part classification sort result for a part of the plurality of parts produced by the part production process.

9. The method according to claim 1, wherein the state of the process variable is determined based on a determination that the response characteristic has exceeded a limit established in relation to the response characteristic.

10. The method according to claim 1, wherein the state of the process variable is determined based on identification of a trend in the response characteristic.

11. The method according to claim 1, wherein the state of the process variable is indicative of a magnitude of adjustment of the control.

12. The method according to claim 1, wherein the state of the process variable is indicative of a direction of adjustment of the control.

13. The method according to claim 1, wherein the correlating further comprises:
   acquiring vibrational data for a plurality of parts produced by the part production process;
   obtaining respective process variable values for the process variable for each of the plurality of parts, wherein the respective process variable values differ with regard to the plurality of parts;
   identifying a correlation between the process variable and the vibrational data including evaluating a multidimensional data set in which each of a plurality of vibrational metrics comprise corresponding respective vibrational metric dimensions in the multidimensional data set and the process variable comprises a non-vibrational dimension in the multidimensional data set; and
   correlating the response characteristic from the vibrational data to the process variable.

14. The method according to claim 13, wherein the identifying the correlation includes evaluating a plurality of vibrational metric dimensions relative to the non-vibrational dimension to determine the correlation between a given vibrational metric dimension and the non-vibrational dimension.

15. The method according to claim 14, wherein the evaluating comprises at least one of a non-linear least squares regression, a correlation coefficient analysis, an analysis of variance (ANOVA), k-means clustering, principal components analysis, or random forest analysis.

16. The method according to claim 1, further comprising:
   exciting the first part at the plurality of input frequencies;
   measuring the frequency response of the first part; and
   generating the vibrational data for the first part based on the measured frequency response of the first part.

17. The method according to claim 16, wherein the process variable is a manufacturing variable comprising at least one of a process temperature, a process rate, manufacturing component wear, or a raw material property.

18. The method according to claim 16, wherein the process variable relates to a component variable comprising at least one of a part dimension, a stress state, a crystallographic orientation, a material property, phase ratios, part chemistry, or part microstructure.

19. The method according to claim 1, further comprising: adjusting the control of the part production process.

20. A tool for generating a feedback adjustment for control of a part production system that performs a part production process, comprising:
- a data store comprising vibrational data for at least a first part produced by the part production process, wherein the vibrational data includes a frequency response of the first part when excited at a plurality of input frequencies;
- a vibrational testing system in operative communication with the data store to retrieve the vibrational data, wherein the vibrational testing system is operative to identify a response characteristic of the first part from the vibrational data for the first part that is correlated to a process variable of the part production process that produced the first part and determine a state of the process variable of the part production process that produced the first part based on the response characteristic of the first part that is correlated to the process variable; and
- a control module that is in operative communication with a control of the part production process that controls the process variable, wherein the control module is operative to generate a feedback adjustment for the control of the part production process variable in response to the state of the process variable.

* * * * *